(12) United States Patent
Srinivasan et al.

(10) Patent No.: US 10,948,466 B2
(45) Date of Patent: Mar. 16, 2021

(54) FLOW CONTROL IN AN ELECTROLYTIC REAGENT CONCENTRATOR FOR ION CHROMATOGRAPHY

(71) Applicant: DIONEX CORPORATION, Sunnyvale, CA (US)

(72) Inventors: Kannan Srinivasan, Tracy, CA (US); Mrinal Sengupta, Fremont, CA (US); SM Rahmat Ullah, Fremont, CA (US)

(*) Notice: Subject to any disclaimer, the term of this patent is extended or adjusted under 35 U.S.C. 154(b) by 404 days.

(21) Appl. No.: 15/449,868

(22) Filed: Mar. 3, 2017

(65) Prior Publication Data

US 2018/0252688 A1    Sep. 6, 2018

(51) Int. Cl.
| | | |
|---|---|---|
| G01N 30/96 | (2006.01) | |
| G01N 30/34 | (2006.01) | |
| G01N 30/62 | (2006.01) | |

(52) U.S. Cl.
CPC .......... *G01N 30/96* (2013.01); *G01N 30/34* (2013.01); *G01N 30/62* (2013.01); *G01N 2030/623* (2013.01); *G01N 2030/965* (2013.01)

(58) Field of Classification Search
CPC ......... G01N 30/96; G01N 30/34; G01N 30/62
USPC ............................................ 422/70; 436/161
See application file for complete search history.

(56) References Cited

U.S. PATENT DOCUMENTS

| | | | |
|---|---|---|---|
| 4,357,217 A | 11/1982 | Kuehn et al. | |
| 4,532,811 A | 8/1985 | Miller, Jr. et al. | |
| 4,751,004 A * | 6/1988 | Stevens | G01N 30/84 210/659 |
| 4,751,189 A * | 6/1988 | Rocklin | G01N 30/96 210/656 |
| 4,766,550 A * | 8/1988 | Byers | G01N 33/18 702/30 |
| 4,999,098 A | 3/1991 | Pohl et al. | |
| 5,077,434 A | 12/1991 | Sarumaru et al. | |
| 5,248,426 A * | 9/1993 | Stillian | G01N 30/96 210/198.2 |
| 5,352,360 A | 10/1994 | Stillian et al. | |
| 5,569,365 A * | 10/1996 | Rabin | G01N 30/96 204/450 |
| 6,027,643 A * | 2/2000 | Small | G01N 30/34 205/789 |

(Continued)

FOREIGN PATENT DOCUMENTS

| | | |
|---|---|---|
| CN | 1703269 A | 11/2005 |
| CN | 103842053 A | 6/2006 |

(Continued)

OTHER PUBLICATIONS

Rabin, S. et al, Journal of Chromatography 1993, 640, 97-109.*

(Continued)

*Primary Examiner* — Arlen Soderquist
(74) *Attorney, Agent, or Firm* — David A. Schell; Timothy James Ohara

(57) ABSTRACT

An in-line electrolytic reagent concentrator device that circumvents the need for additional pumps and supplies of reagents to support operation of a carbonate or ammonia removal device. The device generates regenerant solutions as strong as, or even stronger, than commercially recommended regenerant solutions. The device may also regenerate eluent solutions so as to reduce the frequency of eluent maintenance and replacement in ion chromatography systems.

38 Claims, 15 Drawing Sheets

(56) References Cited

U.S. PATENT DOCUMENTS

| | | | |
|---|---|---|---|
| 6,153,101 A * | 11/2000 | Schafer | G01N 30/96 210/198.2 |
| 6,436,719 B1 | 8/2002 | Srinivasan et al. | |
| 6,562,628 B1 * | 5/2003 | Liu | G01N 30/96 422/70 |
| 6,610,546 B1 | 8/2003 | Liu et al. | |
| 6,813,944 B2 | 11/2004 | Mayer et al. | |
| 7,329,346 B2 * | 2/2008 | Liu | G01N 30/62 205/789 |
| 7,618,826 B2 * | 11/2009 | Liu | G01N 30/96 210/198.2 |
| 7,682,506 B2 * | 3/2010 | Srinivasan | G01N 30/96 210/198.2 |
| 7,892,848 B2 * | 2/2011 | Riviello | B01D 61/48 210/198.2 |
| 7,964,411 B2 | 6/2011 | Dasgupta et al. | |
| 8,216,515 B2 * | 7/2012 | Liu | B01D 15/361 210/198.2 |
| 8,425,842 B2 * | 4/2013 | Horiike | G01N 30/96 210/198.2 |
| 8,529,758 B2 * | 9/2013 | Riviello | G01N 30/96 210/198.2 |
| 8,597,571 B2 * | 12/2013 | Riviello | G01N 30/96 422/70 |
| 8,628,652 B2 | 1/2014 | Small et al. | |
| 9,322,815 B2 * | 4/2016 | Srinivasan | G01N 30/96 |
| 9,914,651 B2 * | 3/2018 | Srinivasan | G01N 30/56 |
| 10,023,965 B2 * | 7/2018 | Dasgupta | B01D 61/44 |
| 10,048,233 B2 * | 8/2018 | Srinivasan | G01N 30/02 |
| 2001/0019031 A1 * | 9/2001 | Anderson, Jr. | G01N 30/96 210/656 |
| 2001/0026774 A1 * | 10/2001 | Small | G01N 30/96 422/70 |
| 2002/0162804 A1 * | 11/2002 | Srinivasan | G01N 30/96 210/638 |
| 2002/0177233 A1 * | 11/2002 | Liu | C25B 1/16 436/161 |
| 2002/0192832 A1 * | 12/2002 | Anderson, Jr. | G01N 30/96 436/161 |
| 2003/0127392 A1 | 7/2003 | Srinivasan et al. | |
| 2003/0173222 A1 * | 9/2003 | Srinivasan | B01D 61/48 204/524 |
| 2004/0048389 A1 * | 3/2004 | Liu | B01D 61/44 436/161 |
| 2004/0149581 A1 * | 8/2004 | Srinivasan | B01D 15/367 204/518 |
| 2004/0195100 A1 | 10/2004 | Srinivasan | |
| 2006/0037911 A1 * | 2/2006 | Dasgupta | B01D 19/0031 210/656 |
| 2006/0057733 A1 | 3/2006 | Liu et al. | |
| 2006/0186046 A1 * | 8/2006 | Liu | G01N 30/62 210/656 |
| 2006/0231404 A1 * | 10/2006 | Riviello | B01D 61/48 204/524 |
| 2006/0254969 A1 * | 11/2006 | Yamanaka | B01D 15/361 210/198.2 |
| 2007/0056357 A1 * | 3/2007 | Ruegenberg | G01N 30/32 73/53.01 |
| 2007/0062873 A1 * | 3/2007 | Liu | G01N 30/96 210/656 |
| 2007/0062876 A1 * | 3/2007 | Srinivasan | G01N 30/96 210/660 |
| 2007/0065343 A1 * | 3/2007 | Srinivasan | G01N 30/463 422/70 |
| 2008/0069731 A1 * | 3/2008 | Liu | G01N 30/96 422/70 |
| 2008/0223787 A1 * | 9/2008 | Dasgupta | B01D 19/0031 210/658 |
| 2009/0165873 A1 * | 7/2009 | Chordia | G01N 30/84 137/597 |
| 2009/0188798 A1 * | 7/2009 | Riviello | G01N 30/96 204/520 |
| 2009/0211979 A1 * | 8/2009 | Srinivasan | G01N 30/96 210/656 |
| 2009/0211980 A1 * | 8/2009 | Liu | G01N 30/26 210/659 |
| 2009/0218238 A1 * | 9/2009 | Dasgupta | G01N 30/64 205/789 |
| 2010/0038245 A1 * | 2/2010 | Small | B01D 61/427 204/520 |
| 2010/0284861 A1 * | 11/2010 | Horiike | G01N 30/96 422/70 |
| 2011/0174063 A1 | 7/2011 | Liu et al. | |
| 2012/0241378 A1 | 9/2012 | Riviello | |
| 2012/0285558 A1 * | 11/2012 | Witt | F04B 13/00 137/544 |
| 2013/0048498 A1 * | 2/2013 | Dasgupta | B01D 61/46 204/522 |
| 2013/0220814 A1 | 8/2013 | Dasgupta et al. | |
| 2014/0134050 A1 * | 5/2014 | Srinivasan | G01N 30/02 422/70 |
| 2014/0332387 A1 * | 11/2014 | Srinivasan | G01N 30/56 204/536 |
| 2015/0076005 A1 * | 3/2015 | Srinivasan | G01N 27/333 205/789 |
| 2016/0041133 A1 * | 2/2016 | Pohl | G01N 30/96 204/520 |
| 2016/0137530 A1 * | 5/2016 | Srinivasan | B01D 61/44 73/61.55 |
| 2016/0175778 A1 * | 6/2016 | Oikawa | B01D 61/445 73/61.53 |
| 2016/0187305 A1 * | 6/2016 | Srinivasan | G01N 30/48 210/638 |
| 2017/0199167 A1 * | 7/2017 | Dasgupta | G01N 27/44756 |
| 2017/0212087 A1 * | 7/2017 | Riviello | B01D 15/36 |
| 2018/0065089 A1 * | 3/2018 | Dasgupta | B01D 15/361 |

FOREIGN PATENT DOCUMENTS

| | | |
|---|---|---|
| CN | 103429322 A | 12/2013 |
| WO | WO9832525 A1 | 7/1998 |
| WO | WO200044477 A1 | 8/2000 |
| WO | WO02095341 A1 | 11/2002 |
| WO | WO03078331 A2 | 9/2003 |
| WO | WO2004024302 A1 | 3/2004 |
| WO | WO2006113306 A2 | 10/2006 |
| WO | WO2006128039 A2 | 11/2006 |
| WO | WO2007011919 A2 | 1/2007 |
| WO | WO2009064797 A2 | 5/2009 |
| WO | WO2009108545 A1 | 9/2009 |

OTHER PUBLICATIONS

Haddad, P. R. et al, Journal of Chromatography A 2003, 1000, 725-742.*
Ullah, S. M. R. et al, Analytical Chemistry 2004, 76, 7084-7093.*
Yang, B. et al, Analytical Chemistry 2008, 80, 40-47.*
Masunaga, H. et al, Analytical Science 2012, 28, 1071-1074.*
Masunaga, H. et al, Analytical Science 2014, 30, 477-482.*
Masunaga, H. et al, Journal of Chromatography A 2015, 1392, 69-73.*
Elkin, K. et al, Journal of Chromatography A 2015, 1403, 63-69.*
Saari-Nordhaus, R. et al, Journal of Chromatography A 1997, 782, 75-79.*

* cited by examiner

FIG. 6

CRD Performance with ERC device

| Peak Number | Peak Name | Retention Time (min) | Peak Area (µS*min) |
|---|---|---|---|
| 1 | Fluoride | 3.027 | 0.1805 |
| 2 | Chloride | 4.437 | 0.7194 |
| 3 | Nitrite | 5.37 | 0.3385 |
| 4 | Bromide | 6.43 | 0.1821 |
| 5 | Nitrate | 7.29 | 0.2315 |
| 6 | Phosphate | 10.157 | 0.2625 |
| 7 | Sulfate | 11.757 | 0.3233 |

FIG. 7

CRD Performance with External 200 mM NaOH (prior art)

| Peak Number | Peak Name | Retention Time (min) | Peak Area (µS*min) |
|---|---|---|---|
| 1 | Fluoride | 3.023 | 0.1803 |
| 2 | Chloride | 4.43 | 0.6857 |
| 3 | Nitrite | 5.36 | 0.3353 |
| 4 | Bromide | 6.423 | 0.1809 |
| 5 | Nitrate | 7.283 | 0.2281 |
| 6 | Phosphate | 10.147 | 0.2607 |
| 7 | Sulfate | 11.747 | 0.3157 |

FIG. 9

AS22 4x250 mm Chemistry - Performance Summary

| | | CD | |
|---|---|---|---|
| CD Noise (nS) | | 0.8 nS/cm | |
| CD Background (µS) | | 0.975 µS/cm | |
| Isocratic reproducibility n=15 | | | |
| Peak Name | Peak Ret. Time (min) | %RSD Ret. Time | Peak Area (µS*min) | %RSD Area |
| Fluoride | 3.025 | 0.116 | 0.1806 | 0.137 |
| Chloride | 4.434 | 0.100 | 0.7204 | 0.097 |
| Nitrite | 5.367 | 0.083 | 0.3387 | 0.270 |
| Bromide | 6.428 | 0.058 | 0.1816 | 0.534 |
| Nitrate | 7.287 | 0.050 | 0.2317 | 0.559 |
| Phosphate | 10.156 | 0.037 | 0.2628 | 0.644 |
| Sulfate | 11.754 | 0.032 | 0.3211 | 0.694 |

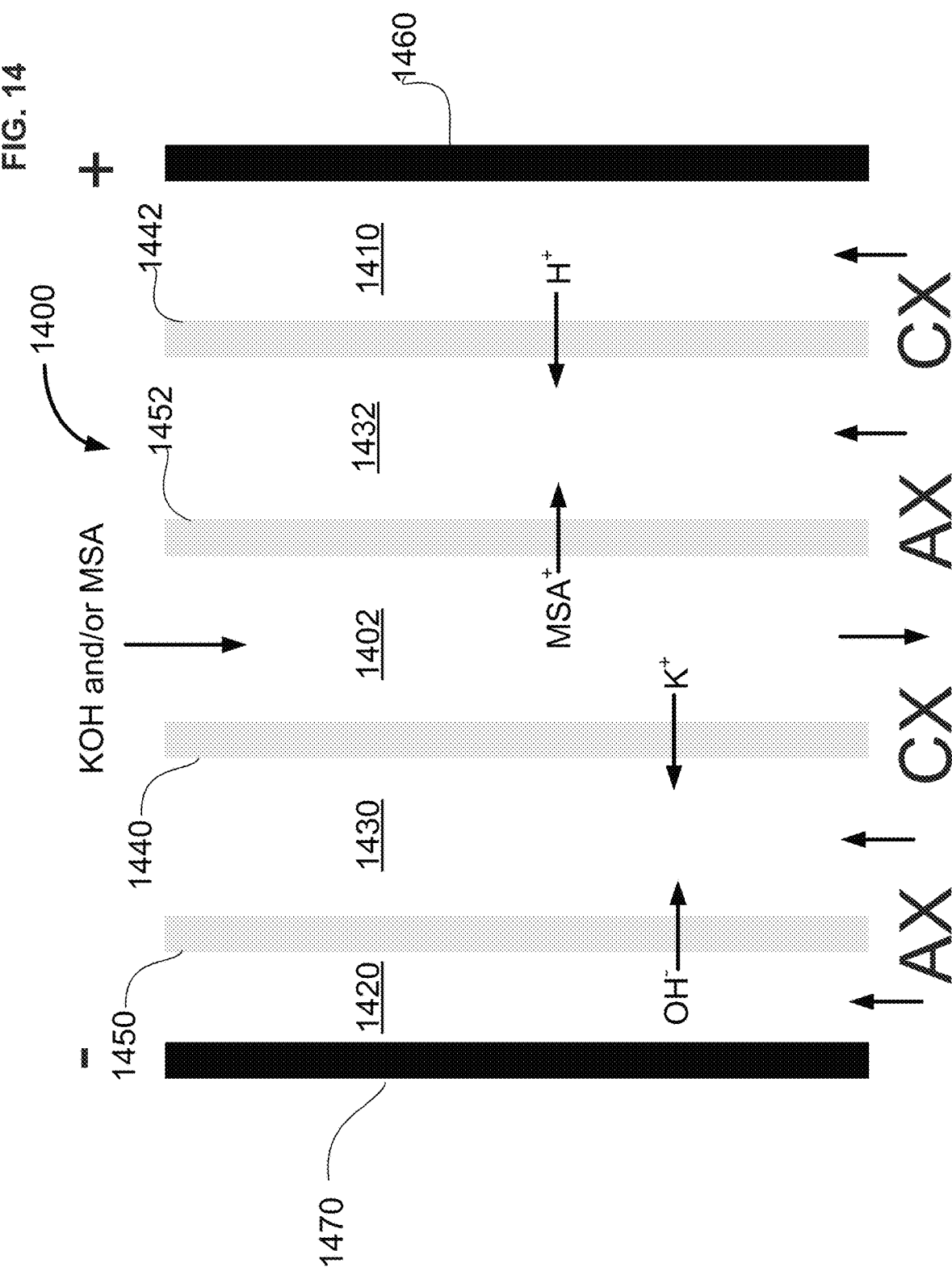

FLOW CONTROL IN AN ELECTROLYTIC REAGENT CONCENTRATOR FOR ION CHROMATOGRAPHY

BACKGROUND

Ion chromatography (IC) is a preferred method for analyzing cationic and anionic analytes in solution. IC systems usually include a suppressor device that is used to lower the conductivity of an eluent and to increase measurement sensitivity for fully dissociated analytes. With hydroxide eluents, the suppressor neutralizes hydroxide by exchanging the eluent cation with hydronium ions to produce weakly dissociated water with a background conductivity that is typically below 1 µS/cm. However, with carbonate and/or bicarbonate eluents, the suppressor converts carbonate species to carbonic acid, and produces a solution that retains a significantly greater background conductivity than neutral pH water. Carbon dioxide, which may be dissolved in samples introduced into the IC system for analysis, also transforms into carbonate species and, upon conversion, can transiently alter conductivity of the eluent stream. Carbon dioxide and carbonate species consequently contribute to reduced measurement sensitivity for other anions, increased measurement noise, and potential measurement interference.

Gas permeable membranes remove carbonic acid from suppressed eluent streams through removal of dissolved carbon dioxide gas. Commercial products, such as the Thermo Scientific™ Dionex™ CRD 300, draw dissolved carbon dioxide gas from the suppressed eluent, driving a dissociation of carbonic acid into more dissolved carbon dioxide gas and water per the chemical equilibrium, thus depleting carbonic acid and ultimately resulting in a suppressed liquid stream having a low total background conductivity. Such carbonate removal devices (CRD) require a pump to pull a vacuum across a gas permeable membrane, or alternately to circulate a basic regenerant solution through a compartment on the opposite side of the gas permeable membrane, in order to physically or chemically draw dissolved carbon dioxide gas from the eluent. One commercial product recommends using a 200 mM sodium hydroxide (NaOH) regenerant solution, recirculated for up to one month of use, to chemically draw carbon dioxide through the gas permeable membrane (e.g., Teflon AF) from the suppressed eluent. These approaches can achieve low background and noise in the signal measured by a conductivity cell, thus improving the signal-to-noise ratios for the target analytes in the IC system. However the need to maintain yet another pump and yet another reagent, as well as the added implementation tasks, increase the operational complexity of IC systems using CRD devices with carbonate eluents.

Relatedly, eluent reagents for IC systems are commonly disposed of as waste after only a single use within the system, requiring periodic replacement with fresh eluent as each batch of reagent is consumed. Frequent production and maintenance of eluent reagents also increases the amount of chemical waste and costs associated with the chemicals.

Improvements such as the disclosed devices and methods are thus needed.

SUMMARY

In one aspect of the invention, an electrolytic reagent concentrator circumvents the need for additional pumps and supplies of reagents. In operation, when the applied voltage exceeds about 1.5 V, reagent ions are transported from a reagent ion source channel into a central concentration channel through a first ion exchange barrier and, concomitantly, counterions generated from the electrolysis of water are transported from a counterion source channel into the central concentration channel through a second ion exchange barrier, with the ion exchange barriers separating the respective channels from each other by blocking the bulk flow of liquids, but not the migration of appropriately charged ions, between the respective channels. The concentrator is configured so that the flow rate of liquid through the central concentration channel is lower than the flow rate of liquid through the reagent ion source channel, thus forming an in situ concentrator mechanism. The device is self-sustaining and does not require any additional pumps or reagents because it can use a waste stream as the source stream for the reagent ion source channel and may split the detector stream into two streams for supplying liquid to the ion source channels and to the central concentration channel, as well as to other ion chromatography devices such as suppressors.

In another aspect of the invention, a method of operating an ion chromatography system including an inline electrolytic reagent concentrator is disclosed. The method includes obtaining a first liquid stream from an ion detector cell of the ion chromatography system and providing the first liquid stream to the reagent ion source channel of the electrolytic reagent concentrator. The first liquid stream may be split so that a greater portion is provided to the counterion source channel and, optionally, a suppressor, before being provided to the reagent ion source channel, while a lesser portion is provided to the regenerant concentration channel so as to concentrate the reagent ion within the regenerant concentration channel and generated solution. In one alternative, the method is used to regenerate a concentrated regenerant solution for a gas removal device. In another alternative, the method is used to regenerate an eluent solution for use with the separation column of an ion chromatography system.

In a first aspect, an electrolytic reagent concentrator device includes a reagent ion source channel, a counterion source channel, a regenerant concentration channel, a first ion exchange barrier, a second ion exchange barrier, an electrode, a counterelectrode, and a flow control device. The first ion exchange barrier can have a first charge and be permeable to at least a reagent ion having a charge of opposite polarity to the first charge, but not to other ions having a charge of a same polarity as the first charge. The first ion exchange barrier separates the reagent ion source channel from the regenerant concentration channel by blocking a bulk flow of a liquid between the reagent ion source channel and the regenerant concentration channel. The second ion exchange barrier can have a second charge opposite in polarity to the first charge and be permeable to at least an electrolytically generated counterion having a charge of opposite polarity to the second charge, but not to other ions having a charge of a same polarity as the second charge. The second ion exchange barrier separates the counterion source channel from the regenerant concentration channel, by blocking the bulk flow of the liquid between the counterion source channel and the regenerant concentration channel. The electrode is in electrical communication with the reagent ion source channel and the counterelectrode is in electrical communication with the counterion source channel. The flow control device can restrict a flow rate of the liquid into the regenerant concentration channel in comparison to a flow rate of the liquid containing the reagent ion into the reagent ion source channel. Note that the first portion of the flow control device controls the flow through a counterion source regenerant channel, an ion source regenerant channel, an ion receiving regenerant channel, and in turn the reagent source channel, which are all fluidly interconnected. The electrode, the reagent ion source channel, the regenerant concentration channel, the counterion source channel, and the counterelectrode can form an electrolytic cell so as to, upon application of an electrolytic potential or current, drive reagent ions from the reagent ion source channel and electrolytically generated counterions from the counterion source channel into the regenerant concentration channel.

In regards to the first aspect, the flow control device can include a first input configured to receive a detector stream from a detector, a first output coupled to an input of the regenerant concentration channel, and a second output coupled to an input of the counterion source channel. The flow control device can restrict a flow rate of the liquid outputted from the first output with respect to a flow rate of the liquid outputted from the second output.

In regards to the first aspect, the counterion source channel can be fluidly interconnected to an ion source regenerant channel of a suppressor and an ion receiving regenerant channel of the suppressor is fluidly interconnected to the reagent source channel.

In regards to the first aspect, the electrode can be disposed adjacent to the reagent ion source channel and the counterelectrode can be disposed adjacent to the counterion source channel.

In regards to the first aspect, the electrode can be disposed in the reagent ion source channel and the counterelectrode can be disposed in the counterion source channel.

In regards to the first aspect, an ion exchange material can be disposed within at least one of the reagent ion source channel, the counterion source channel, and the regenerant concentration channel.

In regards to the first aspect, a neutral packing material can be disposed within the regenerant concentration channel.

In regards to the first aspect, it can further include a gas removal device that includes an eluent channel, a regenerant channel, and a gas permeable membrane separating the eluent channel from the regenerant channel so as to permit a transfer of a gas between the eluent channel and the regenerant channel. The regenerant channel can be downstream of and fluidly interconnected with an output of the regenerant concentration channel, and the eluent channel can be upstream of and fluidly interconnected with an input of the regenerant concentration channel.

In regards to the first aspect, the eluent channel can be upstream of and fluidly interconnected to the flow control device so that the liquid conveyed into the regenerant concentration channel is a fraction of an eluent liquid stream.

In regards to the first aspect, the gas removal device can be a carbonate removal device or an ammonia removal device.

In a second aspect, a suppressor-concentrator device for ion chromatography can include a regenerant channel, an eluent channel, a regenerant concentration channel, a first ion exchange barrier, a second ion exchange barrier, an electrode, a counterelectrode, and a flow control device. The first ion exchange barrier can have a first charge and be permeable to at least an eluent reagent ion having a charge of opposite polarity to the first charge, but not to other ions having a charge of a same polarity as the first charge. The first ion exchange barrier separates the eluent channel from the regenerant concentration channel by blocking a bulk flow of a liquid between the eluent channel and the regenerant concentration channel. The second ion exchange barrier can have a second charge of the same polarity as the first charge and being permeable to at least an electrolytically generated ion having a charge of opposite polarity to the second charge, but not to other ions having a charge of a same polarity as the second charge, wherein the second ion exchange barrier separates the regenerant channel from the eluent channel, by blocking the bulk flow of the liquid between the regenerant channel and the eluent channel. The electrode is in electrical communication with the regenerant channel and the counterelectrode is in electrical communication with the regenerant concentration channel. The flow control device can restrict a flow rate of the liquid into the regenerant concentration channel in comparison to a flow rate of liquid into the eluent channel. The flow control device can be fluidly interconnected with an output of the eluent channel and an input of the regenerant concentration channel such that the flow rate through the regenerant concentration channel is configured to be less than the flow rate through the eluent channel. The electrode, the regenerant channel, the eluent channel, the regenerant concentration channel, and the counterelectrode can form an electrolytic cell so as to, upon application of an electrolytic potential or current, drive eluent reagent ions from the eluent channel into the regenerant concentration channel.

In regards to the second aspect, the flow control device includes a first input configured to receive a detector stream from a detector, a first output coupled to an input of the regenerant concentration channel, and a second output coupled to an input of the regenerant channel, in which the flow control device restricts a flow rate of the liquid outputted from the first output with respect to a flow rate of the liquid outputted from the second output.

In regards to the second aspect, the electrode can be disposed adjacent to the regenerant channel and the counterelectrode can be disposed adjacent to the regenerant concentration channel.

In regards to the second aspect, the electrode can be disposed in the regenerant channel and the counterelectrode can be disposed in the regenerant concentration channel.

In regards to the second aspect, it can further include a gas removal channel disposed adjacent to the regenerant concentration channel. The gas removal channel can have a gas permeable membrane separating the gas removal channel from the regenerant concentration channel.

In regards to the second aspect, it can further include a gas removal device which includes a gas removal channel, a gas regenerant channel, and a gas permeable membrane separating the gas removal channel from the gas regenerant channel so as to permit a transfer of a gas between the gas removal channel and the gas regenerant channel. The gas regenerant channel can be downstream of and fluidly interconnected with the regenerant concentration channel. The gas removal channel can be downstream of and fluidly interconnected with an output of the eluent channel.

In regards to the second aspect, it can further include a gas removal channel positioned within the regenerant concentration channel where the gas removal channel is defined by a gas permeable tubing at least partly disposed in the regenerant concentration channel.

In regards to the second aspect, a gas removal channel can be positioned in an adjoining relationship with the regenerant concentration channel. The counterelectrode can be in electrical communication with the regenerant concentration channel where the gas removal channel is defined by a planar gas permeable tubing at least partly disposed in the regenerant concentration channel.

In regards to the second aspect, the counterelectrode can be porous or includes a plurality of apertures extending therethrough.

In a third aspect, a method of operating an ion chromatography system can include flowing a first liquid stream from an ion receiving regenerant channel of a suppressor of the ion chromatography system where the first liquid stream contains at least an eluent reagent ion and water. This method includes obtaining an electrolytic reagent concentrator device of the first aspect. The first liquid stream can be flowed to the reagent ion source channel at a first flow rate. The second liquid stream flowing containing at least water can be flowed to the counterion source channel at a second flow rate. The third liquid stream containing at least water can be flowed to the regenerant concentration channel at a third flow rate, wherein the third flow rate is less than the first flow rate. A current or potential can be applied to the electrode and counterelectrode so as to drive the eluent reagent ions from the reagent ion source channel and electrolytically generated counterions from the counterion source channel into the regenerant concentration channel to form a concentrated regenerant solution.

In regards to the third aspect, the method can further include obtaining a gas removal device from the first aspect. The gas regenerant channel can be downstream of and fluidly interconnected with the regenerant concentration channel. The concentrated regenerant solution from the electrolytic reagent concentrator device can be flowed to the gas regenerant channel of the gas removal device.

In regards to the third aspect, the first liquid stream in the reagent ion source channel can flow countercurrent to the third liquid stream in the regenerant concentration channel.

In regards to the third aspect, the applied current to the electrode and counterelectrode can be at a predetermined level.

In regards to the third aspect, the electrolytic reagent concentrator can further include a flow control device for restricting the third flow rate of the third liquid stream into the regenerant concentration channel in comparison to the first flow rate of the first liquid stream into the reagent ion source channel. This method can further include flowing a fourth liquid stream from the gas removal channel to the flow control device, providing via the flow control device a first portion of the fourth liquid stream as an input to a ion source regenerant channel of the suppressor, and providing via the flow control device a second portion of the fourth liquid stream as the third liquid stream to the regenerant concentration channel. The second portion can have a flow rate that is less than a flow rate of the first portion.

In regards to the third aspect, it can further include flowing an output of the counterion source channel to an ion source regenerant channel of a suppressor device, flowing an output of the ion source regenerant channel of the suppressor device to the ion receiving regenerant channel of the suppressor device, and flowing an output of the ion receiving regenerant channel of the suppressor device as the first liquid stream to the reagent ion source channel.

In regards to the third aspect, a flow rate ratio is a flow rate of the first liquid stream divided by a flow rate of the third liquid stream. The flow rate ratio can range from about 2/1 to about 1000/1, or about 2/1 to about 200/1, or about 10/1 to about 30/1.

In regards to the third aspect, the concentrated regenerant solution can be a base solution and the gas removal device can be a carbonate removal device, or the concentrated regenerant solution can be an acid solution and the gas removal device can be an ammonia removal device.

In a fourth aspect, a method of operating an ion chromatography system can include flowing a first liquid stream from an ion detector cell of the ion chromatography system where the first liquid stream contains at least water. This method includes obtaining a suppressor-concentrator device of the second aspect. The first liquid stream can be flowed to the regenerant channel at a first flow rate. The eluent from a separation column of the ion chromatography system as a second liquid stream can be flowed to the eluent channel at a second flow rate. The third liquid stream containing at least water can be flowed to the regenerant concentration channel at a third flow rate, wherein the third flow rate is less than the second flow rate. A current or potential can be applied to the electrode and counterelectrode so as to drive the eluent reagent ions from the eluent channel to the regenerant concentration channel and to electrolytically generate counterions in the regenerant concentration channel to form a concentrated regenerant solution.

In regards to the fourth aspect, the method can further include obtaining a gas removal device from the second aspect. The gas regenerant channel can be downstream of and fluidly interconnected with the regenerant concentration channel. The concentrated regenerant solution from the suppressor-concentrator device can be flowed as an input to the gas regenerant channel of the gas removal device.

In regards to the fourth aspect, the suppressor-concentrator device can further include a flow control device for restricting a flow rate of the liquid into the regenerant concentration channel in comparison to a flow rate of the liquid into the eluent channel. The flow control device can be interconnected with an output of the eluent channel and an input of the regenerant concentration channel such that the flow rate through the regenerant concentration channel is configured to be less than the flow rate through the eluent channel. The method further includes providing via the flow control device a first portion as the first liquid stream to the regenerant channel; and providing via the flow control device a second portion as the third liquid stream to the regenerant concentration channel, the second portion having a flow rate that is less than a flow rate of the liquid into the eluent channel;

In regards to the fourth aspect, the electrode, the regenerant channel, the eluent channel, the regenerant concentration channel, and the counterelectrode can form an electrolytic cell so as to, upon application of an electrolytic potential or current, drive eluent reagent ions from the eluent channel into the regenerant concentration channel.

In regards to the fourth aspect, a flow rate ratio is a flow rate of the second liquid stream divided by a flow rate of the third liquid stream. The flow rate ratio can range from about 2/1 to about 1000/1, or about 2/1 to about 200/1, or about 10/1 to about 30/1.

In a fifth aspect, a method of operating an ion chromatography system can include providing an electrolytic reagent concentrator device that includes a first channel, a second channel, a central channel, a first ion exchange barrier, a second ion exchange barrier, a first electrode, a second electrode, and a gas removal device. The first ion exchange barrier can have a first charge and is permeable to ions having a charge opposite to the first charge, but not ions having a same polarity as the first charge, and does not allow bulk flow of a liquid, separating the first channel from the central channel. The second ion exchange barrier can have a second charge and is permeable to ions having a charge opposite to the second charge, but not ions having a same polarity as the second charge, and does not allow bulk flow of the liquid, separating the first channel from the central channel. The first electrode is disposed in the first channel and the second electrode is disposed in the first channel. The gas removal device includes a gas removal channel, a gas regenerant channel, and a gas permeable membrane separating the gas removal channel from the gas regenerant channel so as to permit a transfer of a gas between the gas removal channel and the gas regenerant channel. A current or potential can be applied between the first electrode and the second electrode causing the first electrode to have a positive charge and the second electrode to have a negative charge. A charged analyte along with an eluent can be flowed through a chromatography column and a detector. At least a portion of the eluent can be flowed from the detector to the central channel at a first flow rate. A first liquid stream can be flowed at a second flow rate to a channel selected from the group consisting of the first channel and the second channel. The first flow rate can be lower than the second flow rate if the eluent at a first flow rate is in a vicinity of one of the first and second electrodes that has a same charge as the charged analyte. The eluent is in the vicinity if the eluent is in a channel having an electrode with the same as the charged analyte or if the eluent is in an adjacent channel to a channel having an electrode with the same as the charged analyte. The second flow rate can be lower than the first flow rate if the first liquid stream at a second flow rate is in the vicinity of one of the first and second electrodes that has a same charge as the charged analyte. The first liquid stream is in the vicinity if the first liquid stream is in a channel having an electrode with the same as the charged analyte or if the first liquid stream is in an adjacent channel to a channel having an electrode with the same as the charged analyte.

In a sixth aspect, an electrolytic reagent concentrator device includes a reagent ion source channel, a counterion source channel, a regenerant concentration channel, a first ion exchange barrier, a second ion exchange barrier, an electrode, a counterelectrode, a first pump, and a second pump. The first ion exchange barrier can have a first charge and is permeable to at least a reagent ion having a charge opposite to the first charge, but not ions having a same polarity as the first charge, and does not allow bulk flow of a liquid. The first ion exchange barrier separates the reagent ion source channel from the regenerant concentration channel. The second ion exchange barrier can have a second charge and is permeable to at least an electrolytically generated counterion having a charge opposite to the second charge, but not ions having a same polarity as the second charge, and does not allow bulk flow of the liquid. The second ion exchange barrier separates the counterion source channel from the regenerant concentration channel. The electrode is in electrical communication with the reagent ion source channel and the counterelectrode is in electrical communication with the counterion source channel. The first pump is configured to pump a liquid into the regenerant concentration channel at a first flow rate. The second pump is configured to pump a liquid into the reagent ion source channel at a second flow rate, in which the first flow rate is less than the second flow rate.

BRIEF DESCRIPTION OF THE DRAWINGS

FIG. 6 tabulates peak retention time and peak area for the results shown in FIG. 5(a).

FIG. 7 tabulates peak retention time and peak area for the results shown in FIG. 5(b).

FIG. 9 tabulates the retention time and peak response (area) reproducibility statistics, i.e., relative standard deviation, for the fifteen runs run shown in FIG. 8.

FIG. 14 is a schematic diagram of an alternative embodiment of a dual function ERC device configured to generate a concentrated base, a concentrated acid, or both a concentrated base and a concentrated acid at the same time.

DETAILED DESCRIPTION

Figure 1:
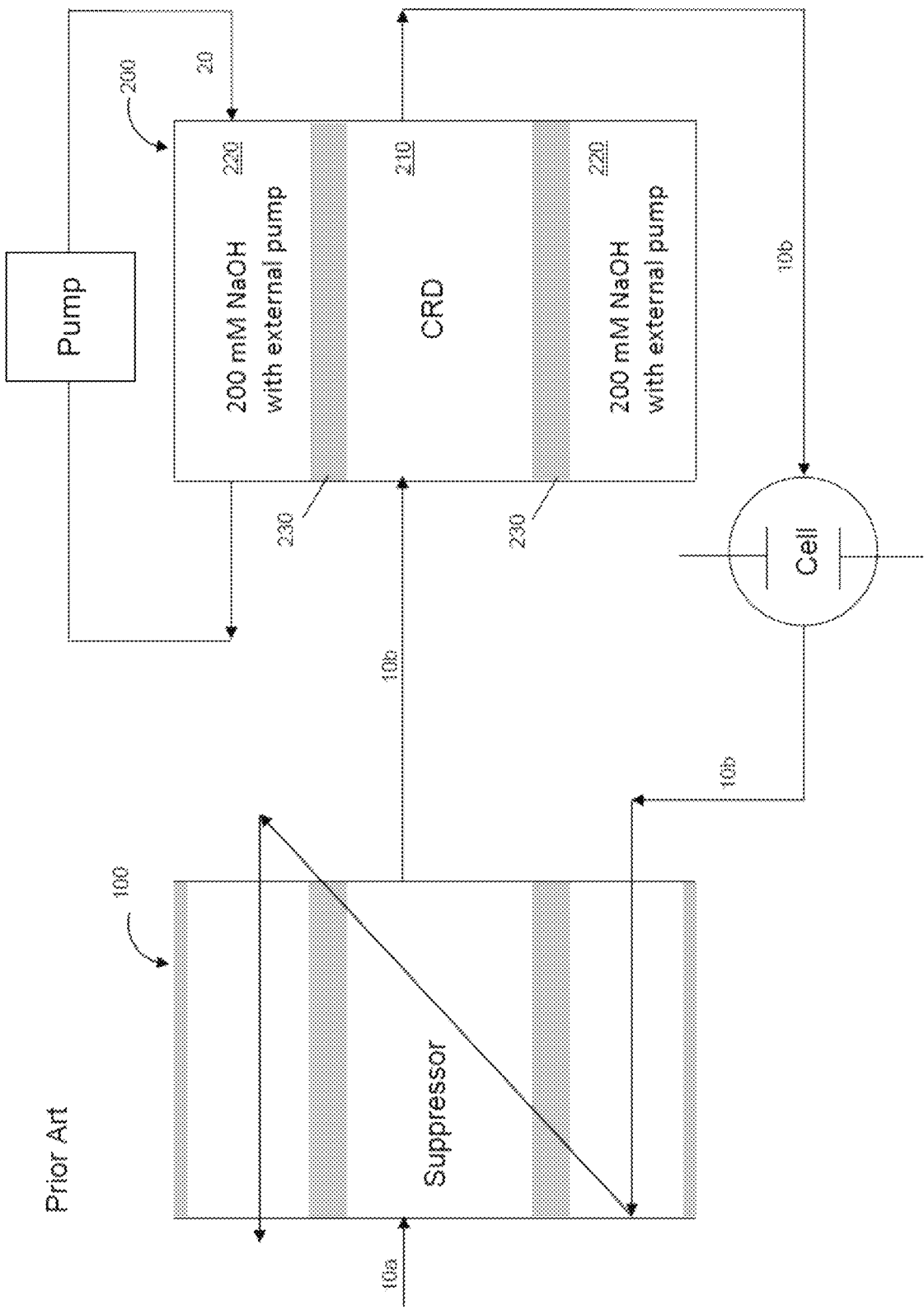
FIG. 1 is a partial schematic diagram of a prior art IC system illustrating suppressor device and carbonate removal device components.

FIG. 1 shows an exemplary prior art system in which an externally-provided, concentrated base solution 20 is pumped by an external pump through a CRD device 200. The CRD device 200 includes an eluent channel 210 for receiving an eluent stream 10b, a regenerant channel 220 for receiving the base solution 20, and a gas permeable membrane 230 separating the respective channels 210, 220. As described above, an eluent stream 10a may be directed through a suppressor 100 that will convert carbonate species into carbonic acid. The suppressed eluent stream 10b is subsequently directed through the CRD device 200 to remove carbonic acid and other carbonate species in chemical equilibrium with that carbonic acid. Carbonic acid is removed by drawing carbon dioxide gas dissolved in the suppressed eluent stream across the gas permeable membrane 230 and into the base solution 20, where it is converted to carbonate anion ($CO_3^{2-}$) and removed via the base solution stream. In such devices, gas permeable membrane 230 can be a tubular membrane so that the regenerant channel 220 illustrated in FIG. 1 is a contiguous channel surrounding the tubular membrane 230.

Figure 2:
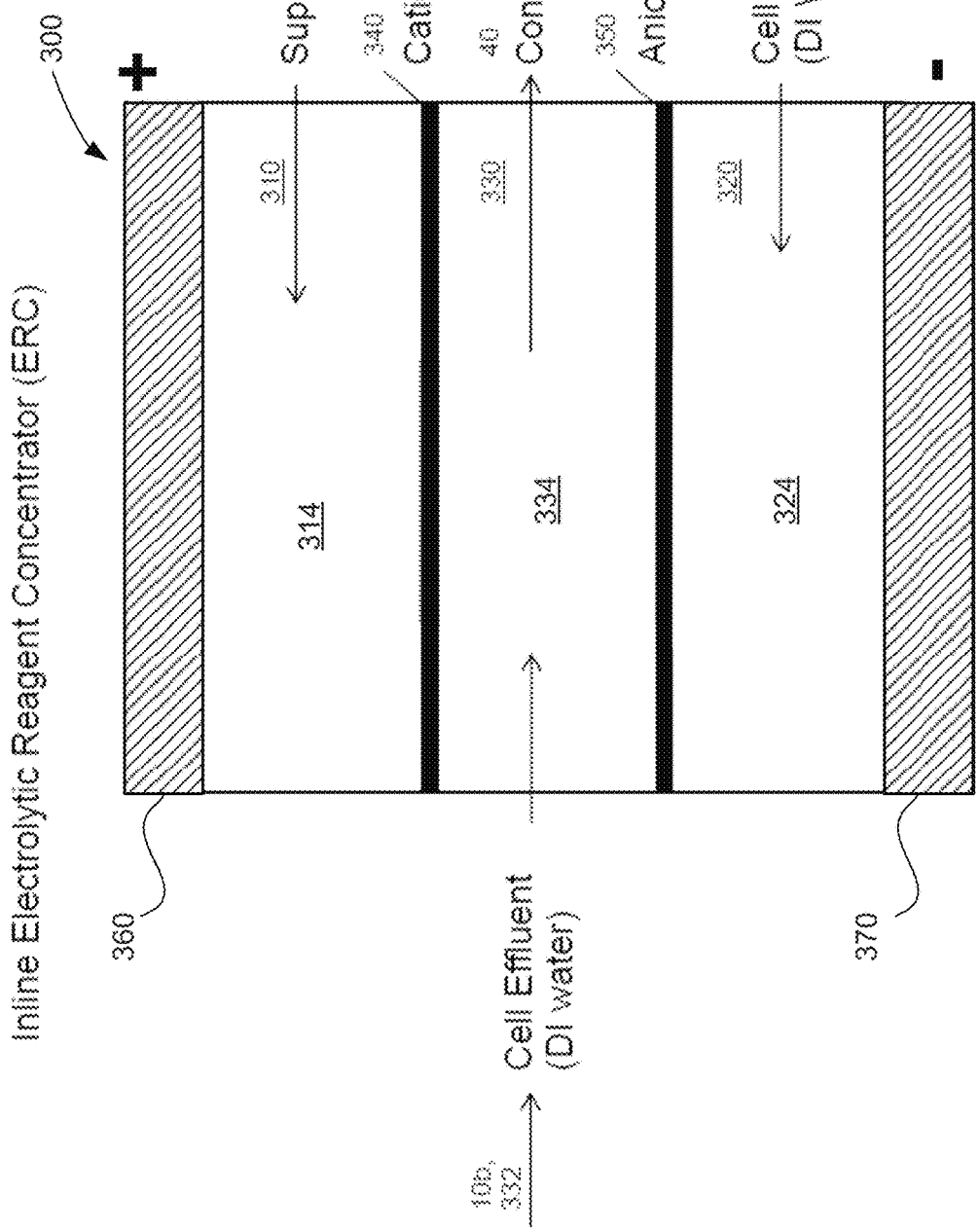
FIG. 2 is a schematic diagram of a first implementation of a first embodiment of an electrolytic reagent concentrator device.

FIG. 2 shows a schematic view of a first embodiment of an electrolytic reagent concentrator (ERC) device 300. Simplistically, the ERC device 300 comprises: a reagent ion source channel 310 for receiving a first liquid stream 312, a counterion source channel 320 for receiving a second liquid stream 322, and a regenerant concentration channel 330 for receiving a third liquid stream 332. The channels 310 and 330 are separated by a cation exchange membrane 340 permeable to at least a reagent cation, such as a sodium cation. In a more general sense, the cation exchange membrane 340 is a first ion exchange membrane that has a charge and is permeable to a reagent ion that has an opposite charge to that of the analyte ions. Preferably, where the analyte is an anion, the reagent ion (e.g., $Na^+$ and $K^+$) is the principal cationic component of the eluent stream 10a. The channels 320 and 330 are separated by an anion exchange membrane 350 permeable to at least hydroxide ions. In a more general sense, the anion exchange membrane 350 is a second ion exchange membrane has a charge (opposite to that of the first ion exchange barrier) and is permeable to counterions (e.g., $OH^-$) that have an opposite charge to that of the reagent ion. Thus, the reagent cation, and potentially other cations, can be driven by an applied potential (voltage difference) from the reagent ion source channel 310 into the regenerant concentration channel 330, but not from the regenerant concentration channel 330 into the counterion source channel 320. Conversely, hydroxide ions and, potentially, other anions, can be driven by the applied potential from the counterion source channel 320 into the regenerant concentration channel 330, but not from the regenerant concentration channel 330 into the reagent ion source channel 310. It should be noted that an ion exchange membrane can also be referred to as an ion exchange barrier.

The ERC device 300 further comprises a pair of electrodes 360 and 370 disposed adjacent to (or disposed in) the ion source channels 310 and 320, respectively. In FIG. 2, an anode 360 is disposed adjacent to and in electrical contact with the reagent ion source channel 310, and a cathode 370 is disposed adjacent to and in electrical contact with the counterion source channel 320. In general, the electrode 360 adjacent to the reagent ion source channel 310 drives reagent cations from the reagent ion source channel into the regenerant concentration channel 330 and the electrode 370 adjacent to the counterion source channel 320 electrolytically generates hydroxide counterions and drives them into the regenerant concentration channel 330 to aid in the formation of the concentrated reagent. The anode 360 is an electrode, preferably manufactured from a noble metal such as platinum or titanium coated with platinum, although any electrode suitable for the electrolysis of water may be used. The cathode 370 is an electrode manufactured from either the same or a different such suitable material. In operation, the anode 360 and cathode 370 are connected to a suitable power supply (not shown), so that the assembly of the anode 360, channels 310, 330, 320, and the cathode 370 form an electrolytic cell. During operation an electrolytic potential or current is applied, and generates hydronium and hydroxide at the anode 360 and cathode 370, respectively. The electrolytically generated hydronium ions at the anode 360 combine with the anions in the source stream such as hydroxide ions in the channel 310 to form water while the reagent cations are driven across the first ion exchange barrier, e.g., cation exchange membrane 340 towards the regenerant concentration channel 330. At the same time, the electrolytically generated hydroxide ions at the cathode 370 are driven across the second ion exchange barrier, e.g., anion exchange membrane 350 towards the regenerant concentration channel 330. The reagent cations and hydroxide counterions combine to form a reagent cation hydroxide within the regenerant concentration channel 330 as the third liquid stream 332 passes through, and is outputted as a basic concentrated regenerant solution stream 40. That basic regenerant solution stream 40 may then be input to the regenerant channel of the CRD 200 (shown in FIG. 4). The applied current and respective first and third liquid stream flow rates can be used to control the generated regenerant solution concentration, assuming there is no significant transport of hydronium ions from the reagent ion source channel 310 to the regenerant concentration channel 330. If significant transport of hydronium ions occurs then significant quantities of acid may neutralize the generated base, compromising the regenerant solution concentration function. Thus, preferably, the first liquid stream 312 should contain a sufficiently high concentration of reagent cations so that the reagent cations transport through the cation exchange membrane 340 instead of hydronium ions.

Ion exchange materials, such as the functionalized screen materials disclosed in U.S. Pat. No. 4,999,098, which is incorporated by reference in its entirety, may be used in screens 314, 324, and 334 or other structures including but not limited to porous resins, beads, and monoliths, provided within the respective channels to facilitate transfer of the reagent cation and/or hydroxyl counterion into the regenerant concentration channel 330. In one preferred embodiment the screen 314 in channel 310 is a predominantly cation exchange material while the screen 324 in the channel 320 is a predominantly anion exchange material. The screen 334 in the regenerant concentration channel 330 may be a low capacity ion exchange material or even an unfunctionalized, neutral packing material to aid a drop in applied potential and to achieve near 100% current efficiency, as described in U.S. Pat. No. 6,077,434, which is also incorporated by reference in its entirety. In an embodiment, a planar screen can be disposed in a channel parallel to the planar electrodes. The preferred configuration results in minimal formation of water in regenerant concentration channel 330 so that improved regenerant solution concentration factors are achieved. Such materials may be provided in one or more of the channels 310, 320, 330 and in any combination of the channels.

In use, the reagent cations, and, possibly, other cations and anions, are concentrated within the regenerant concentration channel 330. Hydronium and hydroxide will neutralize to form water, but with optimization of the applied electrolytic potential or current, formation of a solution containing the reagent cation and hydroxyl counterions will be favored. When reagent cations are collected from an eluent waste stream such as an ion detector cell eluent waste stream or a suppressor device waste stream, most or essentially all of the reagent cations can be captured within the basic regenerant stream. With typical IC eluent strengths of, e.g., 15 mM sodium carbonate ($Na_2CO_3$), the device can generate a basic regenerant solution with a strength approximately proportional to the reagent cation concentration, in the example, about 30 mM sodium. Yet, advantageously, the ERC device 300 can be operated, or structurally configured, as a concentrator to generate regenerant solutions as strong as, or even stronger, than commercially recommended regenerant solutions. A preferred concentration of the concentrated reagent is 100 to 500 mM, more preferred is 150 to 300 mM, and most preferred is 200 to 300 mM. The reader should note that the flow rate through the regenerant concentration channel 330, the applied electrolytic current, or both can be adjusted to change the concentration of reagent cation and hydroxide within the regenerant solution as needed.

Figure 3:
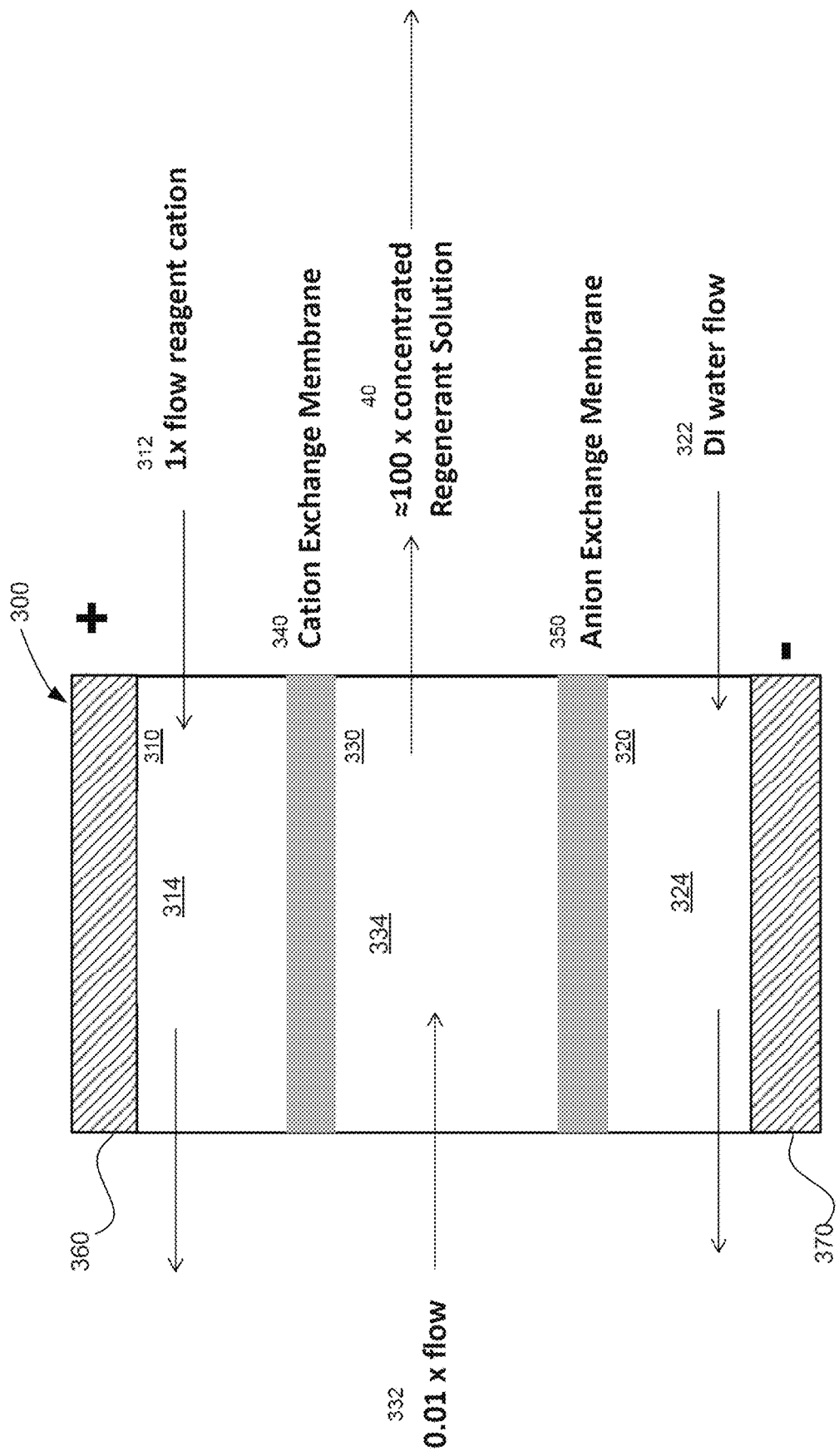
FIG. 3 illustrates concentration behavior achieved by operating the device of FIG. 2 with a flow rate through the regenerant concentration channel that is significantly less than that in the device's ion source channels.

FIG. 3 illustrates that reducing the flow rate of the third liquid stream 332 within the regenerant concentration channel 330 can concentrate ionic species with the regenerant concentration channel 330. Cations in the first liquid stream 312 or reagent ion source channel 310 migrate into the regenerant concentration channel 330 and are replaced by hydronium ions generated at the anode 360, while anions generated by the electrode 370 in the counterion source channel 320 migrate into the regenerant concentration channel 330 and combine with the cations. The reagent cations from a larger volume of the first liquid stream 312, flowing through the device at a greater flow rate, are collected and concentrated within the third liquid stream 332, flowing through the device at a lesser flow rate. With low flow rate ratios (concentration channel 330 flow rate to reagent ion source channel 310 flow rate), basic regenerant solutions of up to 300 mM NaOH have been produced. This concentration is more than suitable for removal of carbon dioxide in existing commercial CRD devices. In some implementations of the device, external pumps and reservoirs could be used to configure the flow rate of the third liquid stream 332 through the regenerant concentration channel 330 to be significantly less than the flow rate of the first and second liquid streams 312 and 322 through their respective ion source channels 310 and 320. By including an optional flow control device 380 having, e.g., one or more valves, one or more restriction orifices, one or more restriction tubes (tubes having a restricted inner diameter and/or tortuous flow path in comparison to one or more "unrestricted" tubes), and/or other known elements for fractionating a flow stream into major and minor substreams, the ERC device 300 can be operated inline and without any added pumps or externally-supplied reagents by using suppressor waste and/or conductivity cell eluent waste streams for the first and second liquid streams 312, 322, and a separated, minor fraction of one of those waste streams for the third liquid stream 332. The reader should note that the concentration factor of the reagent cation is dictated by the flow rate ratio of the first liquid stream 312 to that of the third liquid stream 332. In an embodiment, a flow rate ratio of the first liquid stream 312 to that of the third liquid stream 332 (i.e., flow rate of the first liquid stream 312/flow rate of the third liquid stream 332) may range from about 2/1 to about 1000/1, preferably range from about 2/1 to about 200/1, more preferably range from about 2/1 to about 100/1, yet more preferably range from about 2/1 to about 50/1, and even yet more preferably range from about 10/1 to about 30/1. The flow rate of the second liquid stream 322 does not play a direct role in the concentration aspect other than providing water (which is at an intrinsically high concentration) for the electrolysis process, although the liquid may be reused in connection with a suppressor and/or the first liquid stream as described below.

Figure 4:
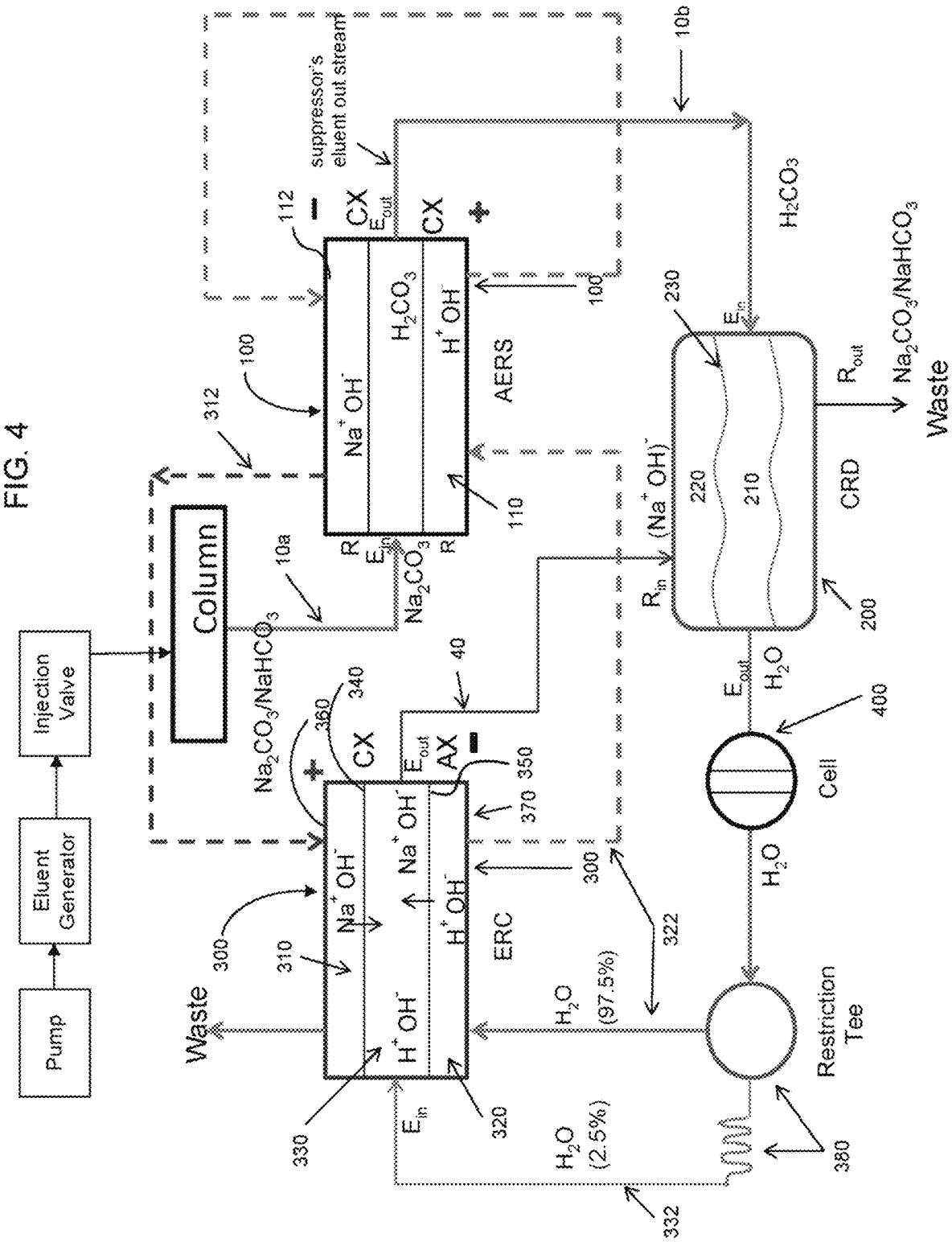
FIG. 4 is a schematic diagram of a first implementation of an IC system employing the electrolytic concentrator device of FIG. 2.

FIG. 4 schematically diagrams an implementation of the first embodiment. A pump can be used to pump a liquid into an optional eluent generator for carbonate. If there is no eluent generate a carbonate eluent can be pumped by the pump through an injection valve. A negatively charged analyte can be injected in the injector and flowed to a chromatography column with the eluent. Eluent waste from an ion detector cell 400, such as a conductivity detector cell, is split and used as the second liquid stream 322 and third liquid stream 332 to the ERC device 300. The second liquid stream 322 is subsequently directed into an ion source regenerant channel 110 of the suppressor device 100, then to an ion receiving regenerant channel 112, and then reused yet again as the first liquid stream 312 of the ERC device 300. Consequently, the ERC device 300 can function as an inline concentrator in which liquid flows are driven by the same system pump powering the flow of the eluent stream within the IC system, and in which the liquid flows are, directly or indirectly, sourced entirely from the eluent waste stream. Thus, a single pump can be used to pump eluent for the analysis of analyte and also to recycle and concentrate the regenerant solution for the CRD 200. It will be apparent that alternate implementations may source the first liquid stream 312 from a suppressor waste stream that is not hydraulically connected to an eluent waste stream, e.g., a suppressor regenerated using deionized water or other known solutions, and/or may source the second liquid stream 322 from a source of deionized water, and/or may source the third liquid stream 332 from a source of deionized water. An advantage of the illustrated implementation of FIG. 4 is that no additional pumps or reagents are required for operation of the ERC device 300 and the CRD device 200.

Although FIG. 4 illustrates the CRD device 200, ERC device 300, and flow control device 380 in separate functional blocks, it will be apparent that the ERC device itself may include a flow control device 380. In a second embodiment, the device 300 may be manufactured and sold as a self-regenerating CRD device, additionally including the eluent channel 210 for receiving an eluent stream 10b, regenerant channel 220 for receiving the third liquid stream 332 output from the regenerant concentration channel 330, and a gas permeable membrane 230 separating the respective channels 210, 220, with the regenerant channel 220 being fluidly interconnected with the regenerant concentration channel 330. The self-regenerating CRD device embodiment may also itself include a flow control device 380.

Figure 5A:
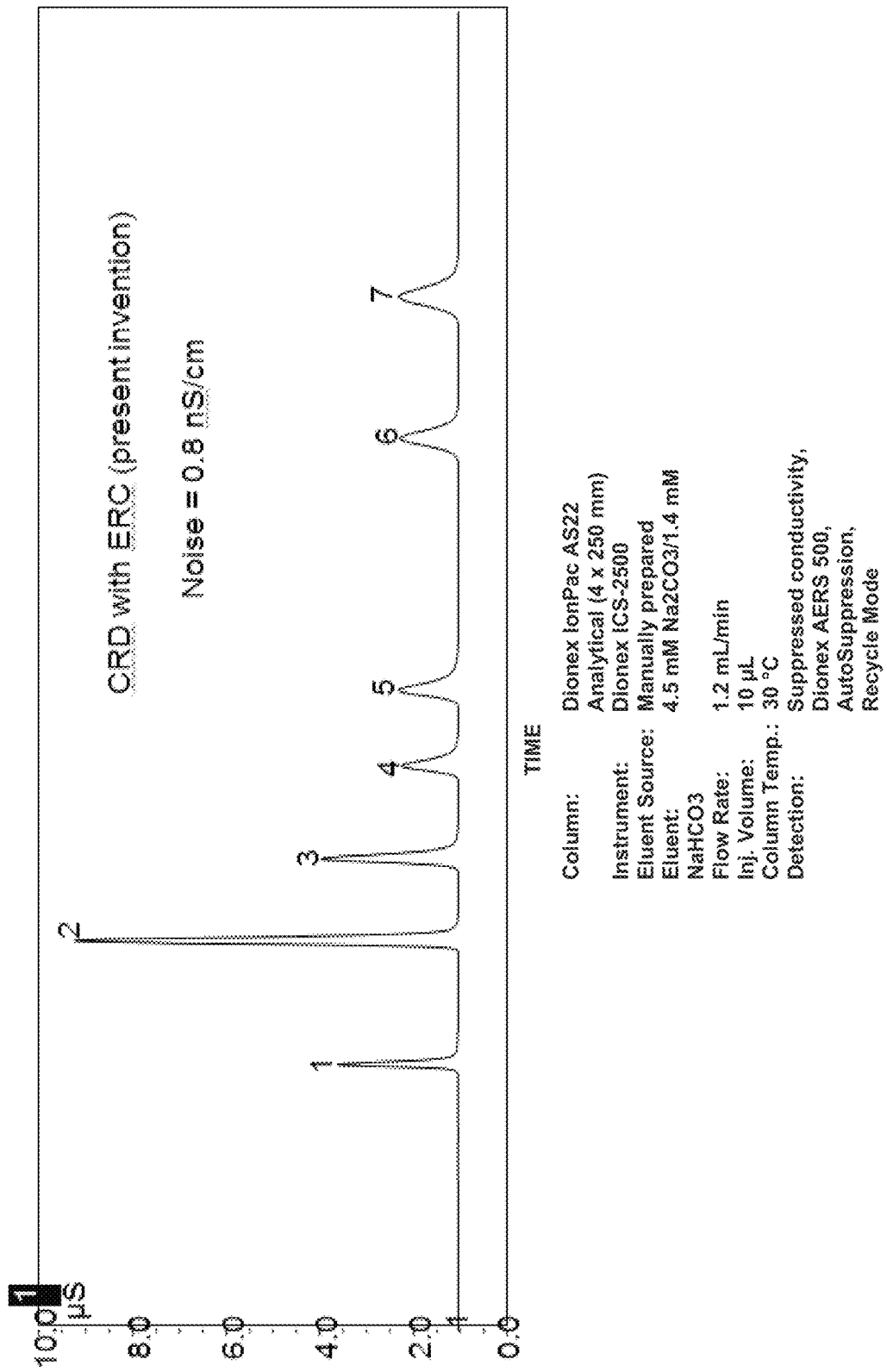
FIGS. 5A and 5B respectively include chromatograms of an anion standard analyzed using (FIG. 5A) the system shown in FIG. 4 and (FIG. 5B) a system similar to to that shown in FIG. 4 except that a CRD was operated with an externally-provided reagent.
Figure 5B:
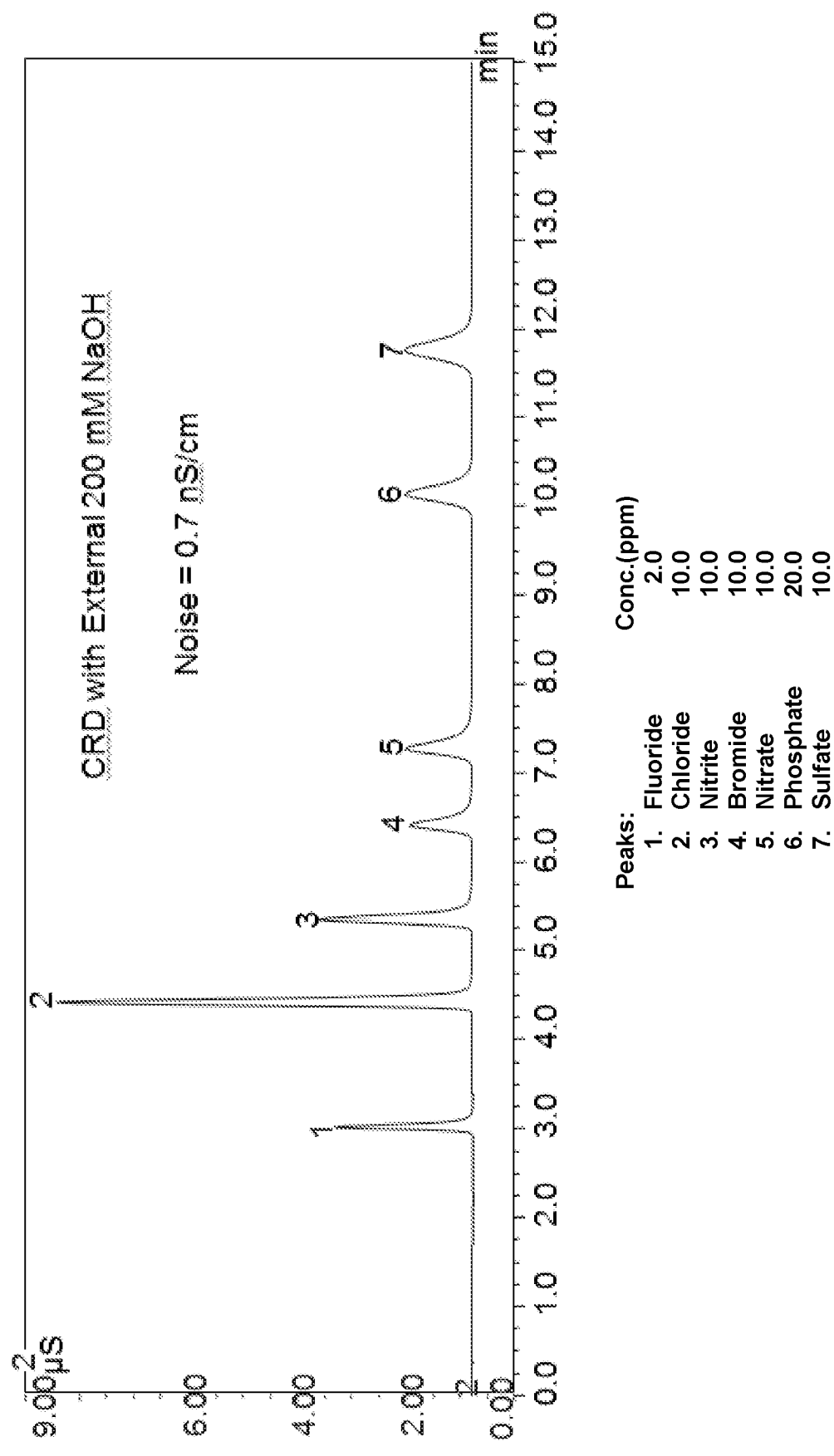
Figure 8:
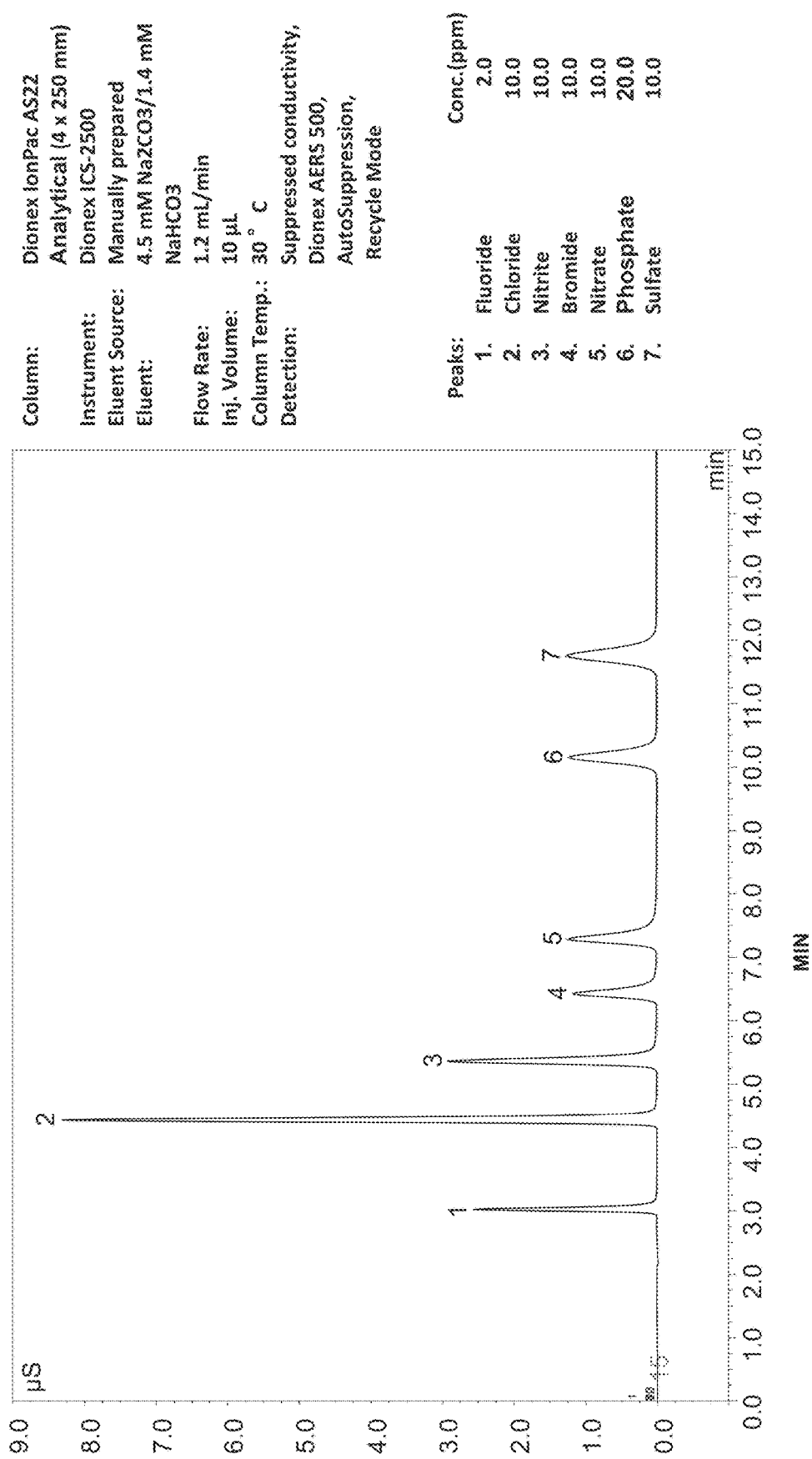
FIG. 8 is an overlay of fifteen chromatographic runs of an anion standard analyzed using the system of FIG. 4; plots of the individual chromatograms are superimposed to visually illustrate reproducible performance of the system.

FIGS. 5A and 5B compare the performance of a commercial CRD device 200 with a prototype ERC device 300 versus the same CRD device 200 regenerated with an external source of base reagent. It will be apparent from peak shape, background conductivity levels, and noise performance that both approaches provide qualitatively comparable levels of performance. FIGS. 6 and 7 provide retention time and peak area for the respective approaches and show that they also have quantitatively comparable performance. FIG. 8 shows an overlay of fifteen injections on the ERC-supplied system, demonstrating the consistent operating quality of the system. FIG. 9 summarizes reproducibility data, for both peak retention time and peak response, for the fifteen injections in terms of relative standard deviation of the measurements with the conductivity detector (CD). The data are consistent with the performance expected from IC systems with commercial CRD devices supplied with manually prepared, pump-circulated regenerant solutions, i.e., <0.5% RSD for retention time and <2% RSD for peak area. It is clear from the above results that these expectations are exceeded by the working example.

Figure 10:
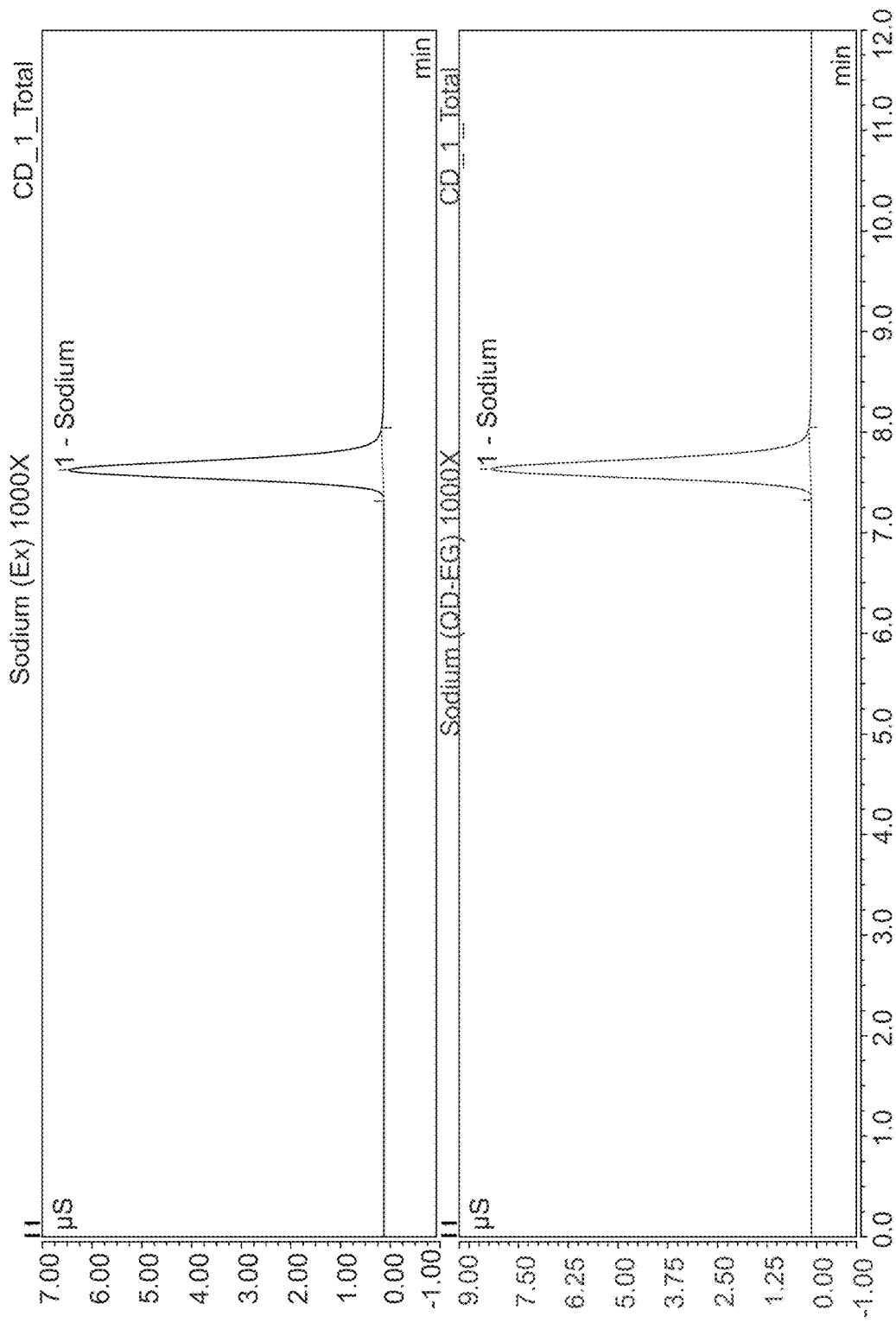
FIG. 10 compares the sodium content for a) a standard comprising 250 mM of NaOH reagent and b) a concentrated reagent produced by a working example.

FIG. 10 plots an anion analysis of the output third liquid stream 332 of the ERC device 300, i.e., a generated basic regenerant solution (lower chromatogram), versus an anion analysis of a 250 mM sodium hydroxide (NaOH) reagent standard (upper chromatogram). Samples of each were diluted-1000 fold and analyzed, then the results plotted as shown. The sodium peak measured with a sample taken from the output of the third liquid stream 332 had a peak height and area that exceeded the peak height and area of the 250 mM sodium hydroxide (NaOH) reagent standard. It is apparent from this analysis that a high concentration basic regenerant solution for delivery to a CRD device can be generated. Specifically, starting with an eluent containing about 10.4 mM of $Na^+$ at a flow rate of 1.2 m L/min and operating the ERC device 300 with a flow ratio (concentration channel 330 to reagent ion source channel 310) of 1 to 30, (ERC concentrator channel flow rate of roughly 0.04 mL/min) it was possible to generate a 300 mM NaOH regenerant stream, representing a 30 fold concentration of sodium cation within in the smaller flow stream, while maintaining excellent chromatographic performance.

Figure 11:
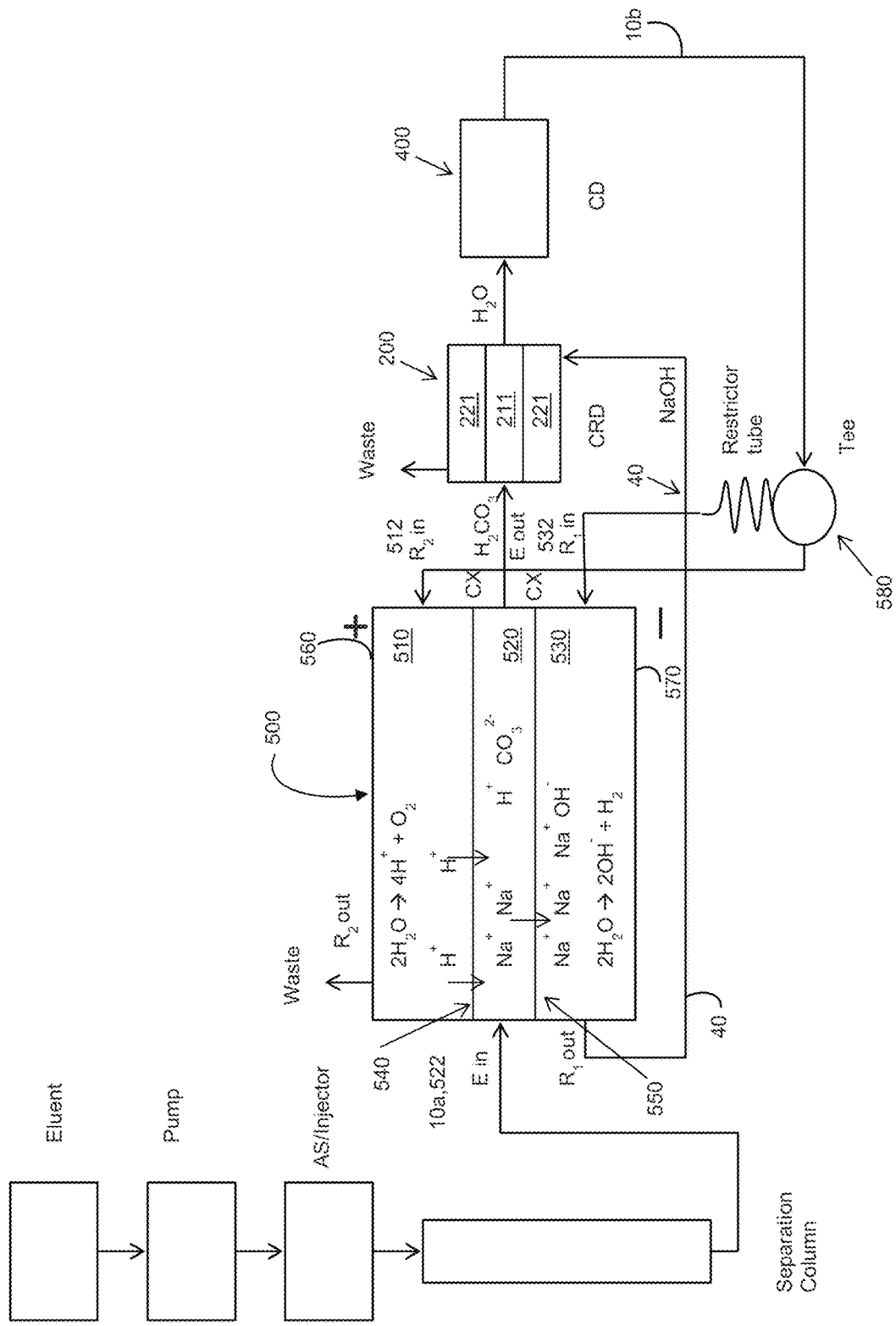
FIG. 11 is a schematic diagram of a first implementation of a third embodiment where the device is a suppressor-concentrator device.

FIG. 11 shows a schematic view of a first implementation of a third embodiment, a suppressor-concentrator 500 for anion analysis. The device 500 comprises: a regenerant channel 510 for receiving a first liquid stream 512, an eluent channel 520 for receiving a second liquid stream 522, i.e., an eluent stream 10a, and a regenerant concentration channel 530 for receiving a third liquid stream 532. The channels 510 and 520 are separated by a first cation exchange membrane 540. Channels 520 and 530 are separated by a second cation exchange membrane 550. Thus, the reagent cation, and potentially other cations, can be driven by an applied electrolytic potential from the eluent channel 520 into the regenerant concentration channel 530. In the regenerant concentration channel 530, the cations combine with the hydroxide generated at the cathode 570 to form the base. Eluent channel 520 can be fluidly connected to a gas removal device 200. The gas removal device 200 includes a gas removal channel 211 and a gas regenerant channel 221 as illustrated in FIG. 11.

The device 500 further comprises an anode 560 disposed adjacent to (or disposed in) and in electrical contact with the regenerant channel 510, and a cathode 570 disposed adjacent to (or disposed in) and in electrical contact with the regenerant concentration channel 530. The anode 560 is an electrode, preferably manufactured from platinum or titanium coated with platinum, although any electrode suitable for the electrolysis of water may be used. The cathode 570 is an electrode manufactured from either the same or a different such suitable material. In use, anode 560 and cathode 570 are connected to a suitable power supply (not shown), so that the assembly of the anode 560, channels 510, 520, 530, and the cathode 570 form an electrolytic cell. During operation an electrolytic potential or current is applied, causing the formation of hydronium and hydroxide at the anode and cathode, respectively. The reagent cations from the eluent stream 10a are driven towards the cathode 570. Those cations combine with hydroxide ions generated at the cathode 570 to form a base regenerant solution 40. The applied current and respective second and third liquid stream flow rates can be used to control the generated regenerant solution concentration, as otherwise described earlier in the disclosure. Similar to device 300, the concentration factor of the reagent cation for device 500 is dictated by a flow rate ratio of the second liquid stream 522 to that of the third liquid stream 532. The flow rate ratio of the second liquid stream 522 to that of the third liquid stream 532 (i.e., flow rate of the second liquid stream 522/flow rate of the third liquid stream 532) may range from about 2/1 to about 1000/1, preferably range from about 2/1 to about 200/1, more preferably range from about 2/1 to about 100/1, yet more preferably range from about 2/1 to about 50/1, and even yet more preferably range from about 10/1 to about 30/1. Ion exchange materials may be provided within the respective channels, in the form of screens or other structures as described above, to facilitate transfer of the reagent cation into the regenerant concentration channel 530. The ion exchange materials may be provided in one or more of the channels 510, 520, 530 and in any combination of the channels.

The device 500 further comprises a flow control device 580 having, e.g., one or more valves, one or more restriction orifices, one or more restriction tubes, and/or other known elements for splitting an input liquid stream (e.g., a waste eluent flow stream) into substreams (such as the at least the first liquid stream 512 and the third liquid stream 532), the flow control device being interconnected with the regenerant and regenerant concentration channels 510 and 530, respectively, such that flow rate of the third liquid stream 532 through the regenerant concentration channel is configurable to be significantly less than the flow rate of the first liquid stream 512 through the regenerant channel.

In operation, the eluent channel 520 and adjoining channels 510 and 530 function as a suppressor. At least the reagent cation, and possibly other cations, will be concentrated within the regenerant concentration channel 530. Hydroxide will be generated within the regenerant concentration channel 530 proximate the cathode 570, forming a solution of the reagent cation and hydroxyl counterions. Most or essentially all of the reagent cations can be captured from the eluent stream 10a, i.e., from the second liquid stream 522, within the generated basic regenerant solution 40. By operating with a significantly lower flow rate through the regenerant concentration channel 530 than the eluent stream 10a/second liquid stream 522, the device 500 operates as a concentrator to generate regenerant solutions as strong as or even stronger than commercially recommended regenerant solutions. The device 500 may be operated to generate a concentrated regenerant solution for a gas removal device such as the carbonate removal device 200 shown in FIG. 11. In another alternative, the device 500 may be operated to regenerate an eluent solution for use with the separation column of an ion chromatography system, with the concentrated regenerant solution 40 being provided to an eluent reservoir and mixed with make-up water to a desired concentration.

Figure 12:
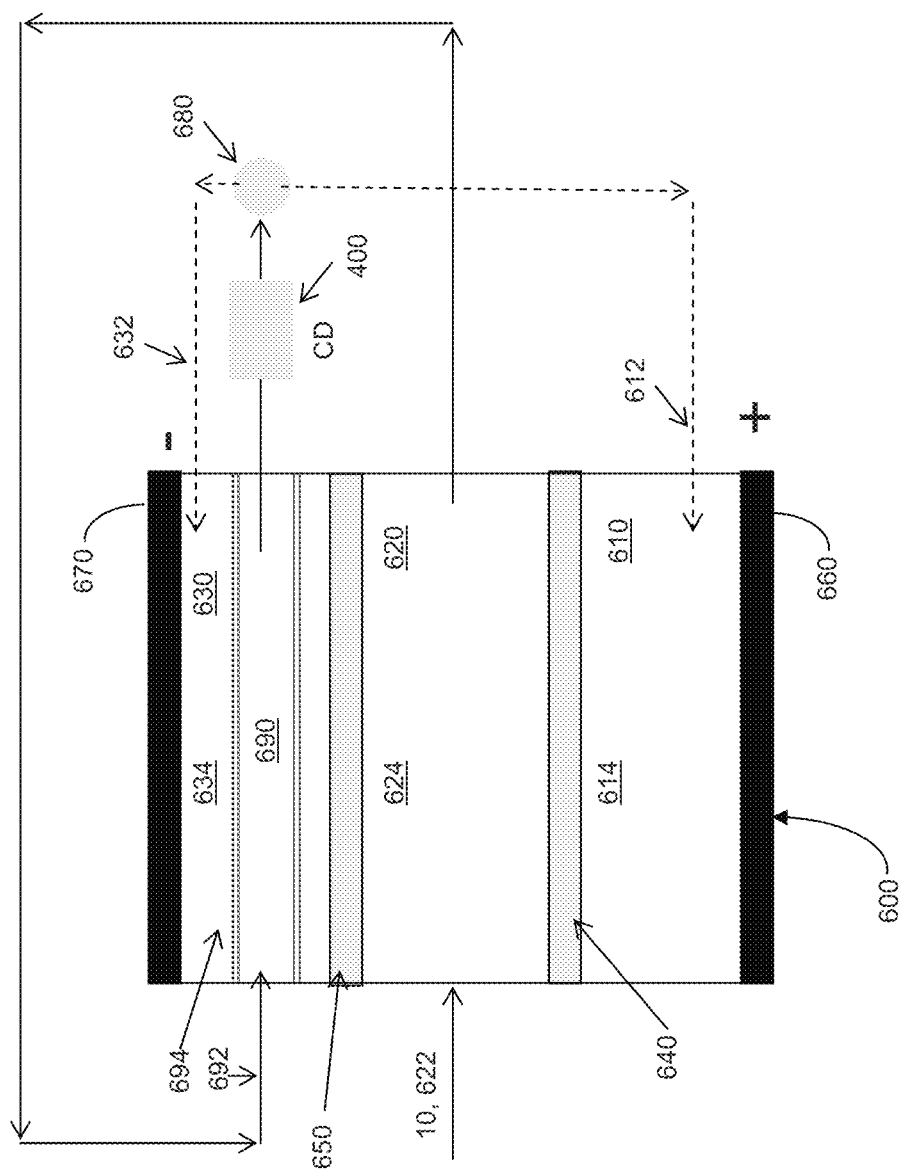
FIG. 12 is a schematic diagram of a second implementation of a third embodiment in which the device is an all-in-one device, namely, a suppressor-concentrator-carbonate removal device where the carbonate removal device is in a tubular configuration.

FIG. 12 shows a schematic view of a second implementation of the third embodiment, forming an all-in-one device 600 providing a suppressor-concentrator-CRD function. As otherwise described in the first implementation above, the device 600 comprises: a regenerant channel 610 for receiving a first liquid stream 612, an eluent suppression channel 620 for receiving a second liquid stream 622 from a separation column, a regenerant concentration channel 630 for receiving a third liquid stream 632, cation exchange membranes 640 and 650 separating the regenerant channel 610 from the eluent suppression channel 620 and the regenerant concentration channel 630 from the eluent suppression channel 620, respectively, an anode 660, and a cathode 670. Ion exchange materials, for example in the form of screens 614, 624, 634 or other structures, may optionally be included, and a flow control device 680 may optionally be included as already connected to device 600 or may be instead be present as a separate device in a kit. The second implementation differs from the first in that the device includes a gas removal channel 690 disposed in the regenerant concentration channel 630. As shown in FIG. 12, the gas removal channel 690 may comprise a gas permeable membrane 694 in a tubular format, positioned within the regenerant concentration channel 630 so as to extend at least partly through the channel 630. The membrane 694 may thus define a gas removal channel 690 for receiving, in effect, a fourth liquid stream 692 of the post-suppression second liquid stream 622. It will be apparent that the gas removal channel 690 could alternately comprise a cartridge or cassette having such a gas permeable membrane to facilitate replacement. The regenerant concentration channel 630 may consequently function like the regenerant channel 220 of the CRD shown in FIG. 4, with carbonate anion drawn across the gas permeable membrane of the carbonate removal channel 690 (as carbon dioxide gas) and removed with a separated, minor fraction of the cell eluent waste stream as system waste.

Figure 13:
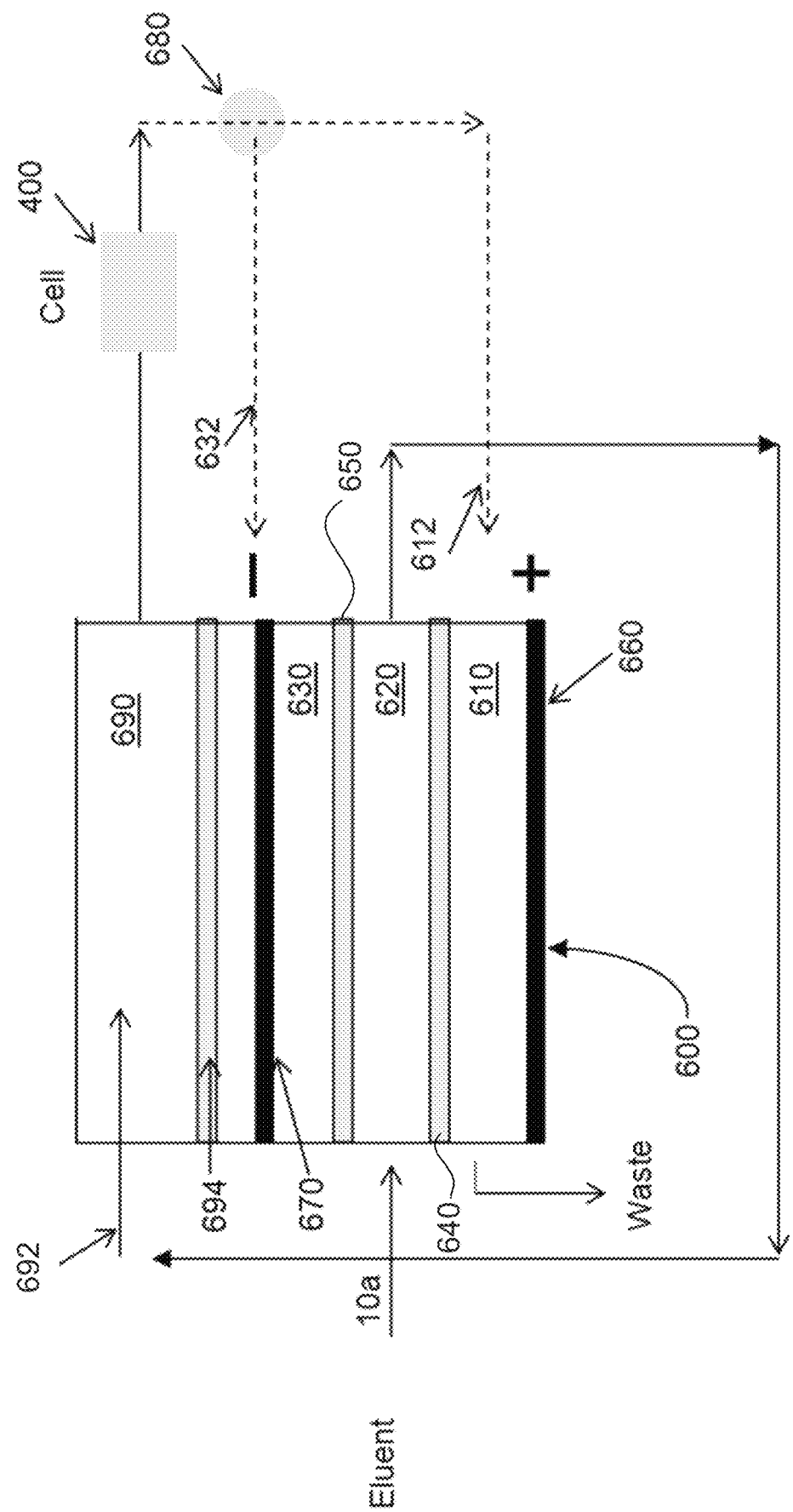
FIG. 13 is a schematic diagram of a variant of the second implementation of the all-in-one device, namely, a suppressor-concentrator-carbonate removal device where the carbonate removal device is in a flat membrane configuration.

FIG. 13 shows a schematic view of an alternative implementation of the third embodiment's all-in-one suppressor/concentrator/CRD, in which the carbonate removal channel 690 is disposed in an adjoining relationship with the regenerant concentration channel 630. The membrane 694 may have a planar format to at least partly form gas removal channel 690 for receiving a fourth liquid stream 692. To maintain optimal gas transfer across the gas permeable membrane 694, the cathode 670 may be disposed adjacent to or within the regenerant concentration channel 630. The regenerant concentration channel 630 functions like the regenerant channel 220 of the CRD shown in FIG. 1, with carbon dioxide gas drawn across the gas permeable membrane 694 of the carbonate removal channel 690 and removed with a third liquid stream 632, i.e., a separated, minor fraction of the cell eluent waste stream, as system waste. The cathode 670 in the variant may be porous and/or include a plurality of apertures extending therethrough to permit the basic regenerant solution, any dissolved carbon dioxide, any sequestered carbonate, and the like to mix across the regenerant concentration channel 630.

FIG. 14 shows an alternative embodiment of a dual function ERC device 1400 configured to generate a concentrated base, a concentrated acid, or both a concentrated base and a concentrated acid at the same time. ERC device 1400 includes a central reagent ion source channel 1402, a hydroxide counterion source channel 1420, a base regenerant concentration channel 1430, an acid regenerant concentration channel 1432, and a hydronium counterion source channel 1410. The hydroxide counterion source channel 1420 and base regenerant concentration channel 1430 are separated by an anion exchange membrane 1450. The base regenerant concentration channel 1430 and central reagent ion source channel 1402 are separated by a cation exchange membrane 1440. The central reagent ion source channel 1402 and acid regenerant concentration channel 1432 are separated by an anion exchange membrane 1452. The acid regenerant concentration channel 1432 and the hydronium counterion source channel 1410 are separated by a cation exchange membrane 1442. A cathode 1470 is disposed in (or adjacent to) and in electrical communication with hydroxide counterion source channel 1420. An anode 1460 is disposed in (or adjacent to) and in electrical communication with hydronium counterion source channel 1410

Referring back to FIG. 14, a source of ions (e.g. KOH and/or methanesulfonic acid) can be inputted into central reagent ion source channel 1402. In an embodiment, the source of ions can come from a regenerant channel of a suppressor and include at least an eluent reagent ion and water. A liquid stream from the detector effluent via a second portion of a flow control device can be inputted into either base regenerant concentration channel 1430 and/or acid regenerant concentration channel 1432. Another liquid stream from the detector effluent via a first portion of the flow control device can be inputted into either hydroxide counterion source channel 1420 and/or hydronium counterion source channel 1410.

While the disclosed devices have been presented in the context of an IC/CRD system where the ERC produces a basic regenerant solution for the CRD (or integrates the function of a CRD), the ERC in a more general context may regenerate eluent solutions for applications such as cation or anion analysis. For an anion analysis application, the disclosed devices can generate concentrated basic reagents containing various reagent cations such as lithium, sodium, potassium, cesium, and ammonium. For a cation analysis application, the disclosed devices can generate concentrated acid reagents containing various reagent anions such as methane sulfonate, sulfate, chloride, phosphate, acetate, and the like to produce methane sulfonic acid, sulfuric acid, hydrochloric acid, and the like. Specifically, electrode 360 may be a cathode and first ion exchange membrane 340 may be an anion exchange membrane permeable to a reagent anion, such as methane sulfonate, that has an opposite charge to the cationic analytes. Correspondingly, counter-electrode 370 may be an anode and second ion exchange membrane 350 may be a cation exchange membrane permeable to at least hydronium ions. Accordingly, an applied electrolytic potential or current will drive the reagent anion and hydronium ions into the regenerant concentration channel 330 to produce an acid eluent solution analogous to the basic regenerant solutions described above. The reader will note that, in effect, only the roles of the reagent ion source channel 310 and counterion source channel 320 in a particular device reverse—by routing a suitable source of reagent ions to a selected channel 310 or 320, and using first and second ion exchange membranes 340 and 350 that are suitable for both operating modes, one can make acid or base eluent solutions by using the same device. Those acid or base eluent solutions may then be input to the ion chromatography system upstream of the separation column as a regenerated eluent solution. Also, for example, if ammonia is to be removed by a CRD-like ammonia removal device it would be advisable to generate an acidic regenerant solution. The source fluid stream for the de-protonated acid component could originate from the suppressor waste steam and the acid concentrated by using a lesser flow rate for the reagent concentration channel 330. The acid regenerant solution stream 40 may then be input to the ammonia removal device. Concentrated acid generation would thus be possible without need for added reagents, delaying the need to replace an eluent reagent source (if used to generate an eluent solution) or the need to maintain yet another pump and yet another reagent for, e.g., an ammonia removal device. The reader will also note that the the type of ion exchange membrane can be altered (cation to anion and vice versa) and the polarity of the electrodes correspondingly altered (cathode to anode and vice versa) in the other embodiments discussed above so as to produce devices which suppress and remove ammonia or other similar compounds.

The embodiments shown and described in the specification are only specific embodiments and are not intended to be limiting in any way. Therefore, various changes, modifications, or alterations to those embodiments may be made without departing from the spirit of the invention as reflected in the following claims.

What is claimed is:

1. An electrolytic reagent concentrator device comprising:
a reagent ion source channel;
a counterion source channel;
a regenerant concentration channel;
a first ion exchange barrier having a first charge and being permeable to at least a reagent ion having a charge of opposite polarity to the first charge, but not to other ions having a charge of a same polarity as the first charge, wherein the first ion exchange barrier separates the reagent ion source channel from the regenerant concentration channel by blocking a bulk flow of a liquid between the reagent ion source channel and the regenerant concentration channel;

a second ion exchange barrier having a second charge opposite in polarity to the first charge and being permeable to at least an electrolytically generated counterion having a charge of opposite polarity to the second charge, but not to other ions having a charge of a same polarity as the second charge, wherein the second ion exchange barrier separates the counterion source channel from the regenerant concentration channel by blocking the bulk flow of the liquid between the counterion source channel and the regenerant concentration channel;

an electrode in electrical communication with the reagent ion source channel;

a counterelectrode in electrical communication with the counterion source channel; and a flow control device without added pumps for restricting a flow rate of the liquid into the regenerant concentration channel in comparison to a flow rate of the liquid containing the reagent ion into the reagent ion source channel, in which the flow control device includes:
  a) an input configured to receive a detector stream from a detector;
  b) a first output coupled to an input of the regenerant concentration channel; and
  c) a second output coupled to an input of the counterion source channel, in which the flow control device fractionates the detector stream into a first substream to the first output and a second substream to the second output and restricts a flow rate of the liquid outputted from the first output with respect to a flow rate of the liquid outputted from the second output;

wherein the electrode, the reagent ion source channel, the regenerant concentration channel, the counterion source channel, and the counterelectrode form an electrolytic cell so as to, upon application of an electrolytic potential or current, drive reagent ions from the reagent ion source channel and electrolytically generated counterions from the counterion source channel into the regenerant concentration channel.

2. The electrolytic reagent concentrator device of claim 1, in which the counterion source channel is fluidly interconnected to an input of the ion source regenerant channel of a suppressor, and an ion receiving regenerant channel of the suppressor is fluidly interconnected to the input of the reagent source channel.

3. The electrolytic reagent concentrator device of claim 1, in which the electrode is disposed adjacent to the reagent ion source channel and the counterelectrode is disposed adjacent to the counterion source channel.

4. The electrolytic reagent concentrator device of claim 1, in which the electrode is disposed in the reagent ion source channel and the counterelectrode is disposed in the counterion source channel.

5. The electrolytic reagent concentrator device of claim 1 further comprising an ion exchange material disposed within at least one of the reagent ion source channel, the counterion source channel, and the regenerant concentration channel.

6. The electrolytic reagent concentrator device of claim 1 further comprising a neutral packing material disposed within the regenerant concentration channel.

7. The electrolytic concentrator device of claim 1 further comprising a gas removal device, the gas removal device including:
  an eluent channel;
  a regenerant channel; and
  a gas permeable membrane separating the eluent channel from the regenerant channel so as to permit a transfer of a gas between the eluent channel and the regenerant channel;
  wherein the regenerant channel is downstream of and fluidly interconnected with an output of the regenerant concentration channel, and the eluent channel is upstream of and fluidly interconnected with an input of the regenerant concentration channel.

8. The electrolytic reagent concentrator device of claim 7, wherein the eluent channel is upstream of and fluidly interconnected to the flow control device so that the liquid conveyed into the regenerant concentration channel is a fraction of an eluent liquid stream.

9. The electrolytic reagent concentrator device of claim 7, wherein the gas removal device comprises a device selected from the group consisting of a carbonate removal device and an ammonia removal device.

10. The electrolytic reagent concentrator device of claim 1, in which the flow control device further includes a restrictor tube coupled to the first output.

11. A suppressor-concentrator device for ion chromatography, the device comprising:
  a regenerant channel;
  an eluent channel;
  a regenerant concentration channel;
  a first ion exchange barrier having a first charge and being permeable to at least an eluent reagent ion having a charge of opposite polarity to the first charge, but not to other ions having a charge of a same polarity as the first charge, wherein the first ion exchange barrier separates the eluent channel from the regenerant concentration channel by blocking a bulk flow of a liquid between the eluent channel and the regenerant concentration channel;
  a second ion exchange barrier having a second charge of the same polarity as the first charge and being permeable to at least an electrolytically generated ion having a charge of opposite polarity to the second charge, but not to other ions having a charge of a same polarity as the second charge, wherein the second ion exchange barrier separates the regenerant channel from the eluent channel, by blocking the bulk flow of the liquid between the regenerant channel and the eluent channel;
  an electrode in electrical communication with the regenerant channel;
  a counterelectrode in electrical communication with the regenerant concentration channel; and
  a flow control device without added pumps for restricting a flow rate of the liquid into the regenerant concentration channel in comparison to a flow rate of liquid into the eluent channel, the flow control device being fluidly interconnected with an output of the eluent channel and an input of the regenerant concentration channel such that the flow rate through the regenerant concentration channel is configured to be less than the flow rate through the eluent channel, in which the flow control device includes:
    a) an input configured to receive a detector stream from a detector;
    b) a first output coupled to an input of the regenerant concentration channel; and c) a second output coupled to an input of the regenerant channel, in which the flow control device fractionates the detector stream into a first substream to the first output and a second substream to the second output and restricts a flow rate of the liquid outputted from the first output with respect to a flow rate of the liquid outputted from the second output;

wherein the electrode, the regenerant channel, the eluent channel, the regenerant concentration channel, and the counterelectrode form an electrolytic cell so as to, upon application of an electrolytic potential or current, drive eluent reagent ions from the eluent channel into the regenerant concentration channel.

12. The suppressor-concentrator device of claim 11, in which the electrode is disposed adjacent to the regenerant channel and the counterelectrode is disposed adjacent to the regenerant concentration channel.

13. The suppressor-concentrator device of claim 11, in which the electrode is disposed in the regenerant channel and the counterelectrode is disposed in the regenerant concentration channel.

14. The suppressor-concentrator device of claim 11 further comprising a gas removal channel disposed adjacent to the regenerant concentration channel, the gas removal channel having a gas permeable membrane separating the gas removal channel from the regenerant concentration channel.

15. The suppressor-concentrator device of claim 11 further comprising a gas removal device, the gas removal device including:
- a gas removal channel;
- a gas regenerant channel; and
- a gas permeable membrane separating the gas removal channel from the gas regenerant channel so as to permit a transfer of a gas between the gas removal channel and the gas regenerant channel;
- wherein the gas regenerant channel is downstream of and fluidly interconnected with the regenerant concentration channel, the gas removal channel is downstream of and fluidly interconnected with an output of the eluent channel.

16. The suppressor-concentrator device of claim 11 further comprising a gas removal channel positioned within the regenerant concentration channel where the gas removal channel is defined by a gas permeable tubing at least partly disposed in the regenerant concentration channel.

17. The suppressor-concentrator device of claim 11, wherein a gas removal channel is positioned in an adjoining relationship with the regenerant concentration channel, and the counterelectrode is in electrical communication with the regenerant concentration channel where the gas removal channel is defined by a planar gas permeable tubing at least partly disposed in the regenerant concentration channel.

18. The suppressor-concentrator device of claim 17, wherein the counterelectrode is porous or includes a plurality of apertures extending therethrough.

19. The suppressor-concentrator device of claim 11, in which the flow control device further includes a restrictor tube coupled to the first output.

20. A method of operating an ion chromatography system, the method comprising:
flowing a first liquid stream from an ion receiving regenerant channel of a suppressor of the ion chromatography system, the first liquid stream containing at least an eluent reagent ion and water;
obtaining an electrolytic reagent concentrator device, the electrolytic reagent concentrator device comprising:
a reagent ion source channel;
a counterion source channel;
a regenerant concentration channel;
a first ion exchange barrier having a first charge and being permeable to at least an eluent reagent ion having a charge of opposite polarity to the first charge, but not to other ions having a charge of a same polarity as the first charge, wherein the first ion exchange barrier separates the reagent ion source channel from the regenerant concentration channel by blocking a bulk flow of a liquid between the reagent ion source channel and the regenerant concentration channel;
a second ion exchange barrier having a second charge opposite in polarity to the first charge and being permeable to at least an electrolytically generated counterion having a charge of opposite polarity to the second charge, but not to other ions having a charge of a same polarity as the second charge, wherein the second ion exchange barrier separates the counterion source channel from the regenerant concentration channel, by blocking the bulk flow of the liquid between the counterion source channel and the regenerant concentration channel;
an electrode in electrical communication with the reagent ion source channel; and
a counterelectrode in electrical communication with the counterion source channel;
a flow control device without added pumps for restricting a flow rate of the liquid into the regenerant concentration channel in comparison to a flow rate of the liquid containing the reagent ion into the reagent ion source channel, in which the flow control device includes:
a) an input configured to receive a detector stream from a detector;
b) a first output coupled to an input of the regenerant concentration channel; and
c) a second output coupled to an input of the counterion source channel, in which the flow control device fractionates the detector stream into a first substream to the first output and a second substream to the second output and restricts a flow rate of the liquid outputted from the first output with respect to a flow rate of the liquid outputted from the second output;
wherein the electrode, the reagent ion source channel, the regenerant concentration channel, the counterion source channel, and the counterelectrode form an electrolytic cell;
flowing the first liquid stream to the reagent ion source channel at a first flow rate;
flowing a second liquid stream containing at least water to the counterion source channel from the second output at a second flow rate;
flowing a third liquid stream containing at least water to the regenerant concentration channel from the first output at a third flow rate, wherein the third flow rate is less than the first flow rate; and
applying a current or potential to the electrode and counterelectrode so as to drive the eluent reagent ions from the reagent ion source channel and electrolytically generated counterions from the counterion source channel into the regenerant concentration channel to form a concentrated regenerant solution.

21. The method of claim 20 further comprising:
obtaining a gas removal device including:
a gas removal channel;

a gas regenerant channel; and
a gas permeable membrane separating the gas removal channel from the gas regenerant channel so as to permit a transfer of a gas between the gas removal channel and the gas regenerant channel; wherein the gas regenerant channel is downstream of and fluidly interconnected with the regenerant concentration channel; and flowing the concentrated regenerant solution from the electrolytic reagent concentrator device to the gas regenerant channel of the gas removal device.

22. The method of claim 21, further comprising: flowing a fourth liquid stream from the gas removal channel to the flow control device, providing via the flow control device a first portion of the fourth liquid stream as an input to an ion source regenerant channel of the suppressor, and providing via the flow control device a second portion of the fourth liquid stream as the third liquid stream to the regenerant concentration channel, the second portion having a flow rate that is less than a flow rate of the first portion.

23. The method of claim 22 further comprises
flowing an output of the counterion source channel to an ion source regenerant channel of a suppressor device,
flowing an output of the ion source regenerant channel of the suppressor device to the ion receiving regenerant channel of the suppressor device, and
flowing an output of the ion receiving regenerant channel of the suppressor device as the first liquid stream to the reagent ion source channel.

24. The method of claim 20, wherein the first liquid stream in the reagent ion source channel flows countercurrent to the third liquid stream in the regenerant concentration channel.

25. The method of claim 20, wherein the applied current to the electrode and counterelectrode is at a predetermined level.

26. The method of claim 20, wherein a flow rate ratio is a flow rate of the first liquid stream divided by a flow rate of the third liquid stream, the flow rate ratio ranging from about 2/1 to about 1000/1.

27. The method of claim 20, wherein a flow rate ratio is a flow rate of the first liquid stream divided by a flow rate of the third liquid stream, the flow rate ratio ranging from about 2/1 to about 200/1.

28. The method of claim 20, wherein a flow rate ratio is a flow rate of the first liquid stream divided by a flow rate of the third liquid stream, the flow rate ratio ranging from about 10/1 to about 30/1.

29. The method of claim 20, wherein the concentrated regenerant solution is a base solution and the gas removal device is a carbonate removal device.

30. The method of claim 20, wherein the concentrated regenerant solution is an acid solution and the gas removal device is an ammonia removal device.

31. The method of claim 20, in which the flow control device further includes a restrictor tube coupled to the first output.

32. A method of operating an ion chromatography system, the method comprising:
flowing an eluent stream from an ion detector cell of the ion chromatography system, the eluent stream containing at least water;
obtaining a suppressor-concentrator device, the suppressor-concentrator device comprising:
a regenerant channel;
an eluent channel;
a regenerant concentration channel;
a first ion exchange barrier having a first charge and being permeable to at least an eluent reagent ion having a charge of opposite polarity to the first charge, but not to other ions having a charge of a same polarity as the first charge, wherein the first ion exchange barrier separates the eluent channel from the regenerant concentration channel by blocking a bulk flow of a liquid between the eluent channel and the regenerant concentration channel;
a second ion exchange barrier having a second charge of the same polarity as the first charge and being permeable to at least an electrolytically generated ion having a charge of opposite polarity to the second charge, but not to other ions having a charge of a same polarity as the second charge, wherein the second ion exchange barrier separates the regenerant channel from the eluent channel, by blocking the bulk flow of the liquid between the regenerant channel and the eluent channel;
an electrode in electrical communication with the regenerant channel;
a counterelectrode in electrical communication with the regenerant concentration channel;
a flow control device without added pumps for restricting a flow rate of the liquid into the regenerant concentration channel in comparison to a flow rate of liquid into the eluent channel, the flow control device being fluidly interconnected with an output of the eluent channel and an input of the regenerant concentration channel such that the flow rate through the regenerant concentration channel is configured to be less than the flow rate through the eluent channel, in which the flow control device includes:
a) an input configured to receive a detector stream from a detector;
b) a first output coupled to an input of the regenerant concentration channel; and
c) a second output coupled to an input of the regenerant channel, in which the flow control device fractionates the detector stream into a first substream to the first output and a second substream to the second output and restricts a flow rate of the liquid outputted from the first output with respect to a flow rate of the liquid outputted from the second output;
flowing a first liquid stream to the regenerant channel from the second output at a first flow rate;
flowing the eluent from a separation column of the ion chromatography system as a second liquid stream to the eluent channel at a second flow rate;
flowing a third liquid stream containing at least water to the regenerant concentration channel from the first output at a third flow rate, wherein the third flow rate is less than the second flow rate;
applying a current or potential to the electrode and counterelectrode so as to drive the eluent reagent ions from the eluent channel to the regenerant concentration channel and to electrolytically generate counterions in the regenerant concentration channel to form a concentrated regenerant solution, in which the method further comprises:
obtaining a gas removal device including:
a gas removal channel;
a gas regenerant channel; and
a gas permeable membrane separating the gas removal channel from the gas regenerant channel so as to permit the transfer of a gas between the gas removal channel and the gas regenerant channel; wherein the gas regenerant channel is downstream of and fluidly interconnected with the regenerant concentration channel; and flowing the concentrated regenerant solution from the suppressor-concentrator device as an input to the gas regenerant channel of the gas removal device.

33. The method of claim 32, further comprising:
providing via the flow control device a first portion as the first liquid stream to the regenerant channel; and
providing via the flow control device a second portion as the third liquid stream to the regenerant concentration channel, the second portion having a flow rate that is less than a flow rate of the liquid into the eluent channel.

34. The method of claim 32, wherein the electrode, the regenerant channel, the eluent channel, the regenerant concentration channel, and the counterelectrode form an electrolytic cell so as to, upon application of an electrolytic potential or current, drive eluent reagent ions from the eluent channel into the regenerant concentration channel.

35. The method of claim 32, wherein a flow rate ratio is a flow rate of the second liquid stream divided by a flow rate of the third liquid stream, the flow rate ratio ranging from about 2/1 to about 1000/1.

36. The method of claim 32, wherein a flow rate ratio is a flow rate of the second liquid stream divided by a flow rate of the third liquid stream, the flow rate ratio ranging from about 2/1 to about 200/1.

37. The method of claim 32, wherein a flow rate ratio is a flow rate of the second liquid stream divided by a flow rate of the third liquid stream, the flow rate ratio ranging from about 10/1 to about 30/1.

38. The method of claim 32, in which the flow control device further includes a restrictor tube coupled to the first output.

* * * * *